US012755195B1

(12) United States Patent
Ghafarianzadeh et al.

(10) Patent No.: US 12,755,195 B1
(45) Date of Patent: Oct. 6, 2026

(54) DATASET GENERATION FROM CLUSTERED SCENARIOS FOR BALANCED MACHINE-LEARNED MODEL TRAINING

(71) Applicant: Zoox, Inc., Foster City, CA (US)

(72) Inventors: Mahsa Ghafarianzadeh, San Francisco, CA (US); Kenneth Michael Siebert, Redwood City, CA (US); Archie Lee, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 711 days.

(21) Appl. No.: 18/138,645

(22) Filed: Apr. 24, 2023

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| | | | | |
|---|---|---|---|---|
| 11,367,141 | B1 * | 6/2022 | Wang | G06Q 40/08 |
| 11,367,142 | B1 * | 6/2022 | Wang | G06N 3/0442 |
| 11,455,660 | B2 * | 9/2022 | Tashiro | G06Q 30/0269 |
| 12,325,449 | B1 * | 6/2025 | Agarwal | G06F 17/40 |
| 12,498,680 | B2 * | 12/2025 | Cella | G05B 13/0265 |
| 2020/0176121 | A1 * | 6/2020 | Dalal | G16H 20/60 |
| 2020/0192366 | A1 * | 6/2020 | Levinson | G01S 15/931 |
| 2020/0245913 | A1 * | 8/2020 | Dalal | A61B 5/14532 |
| 2020/0279651 | A1 * | 9/2020 | Nenoki | G16H 50/70 |
| 2020/0336508 | A1 * | 10/2020 | Srivastava | H04L 63/20 |
| 2020/0380416 | A1 * | 12/2020 | Zion | G06F 16/254 |
| 2021/0398080 | A1 * | 12/2021 | Asanuma | G06Q 10/103 |
| 2022/0108125 | A1 * | 4/2022 | Dai | G06N 7/01 |
| 2022/0292543 | A1 * | 9/2022 | Henderson | G06Q 30/0252 |
| 2023/0176557 | A1 * | 6/2023 | Cella | G05B 13/048 700/117 |
| 2023/0186201 | A1 * | 6/2023 | Cella | G05B 19/0426 705/7.17 |
| 2023/0196230 | A1 * | 6/2023 | Cella | G06V 10/764 |
| 2023/0222454 | A1 * | 7/2023 | Cella | B25J 9/1682 705/28 |
| 2023/0222531 | A1 * | 7/2023 | Cella | B25J 9/1682 705/7.31 |
| 2023/0281527 | A1 * | 9/2023 | Cella | G06V 20/17 705/7.17 |

* cited by examiner

*Primary Examiner* — Eliyah S. Harper
(74) *Attorney, Agent, or Firm* — Lee & Hayes, P.C.

(57) ABSTRACT

Techniques for generating a dataset with clustered scenarios are provided. A first log data associated with a first vehicle is determined based on first criteria. A second log data is determined based on second criteria different from the first criteria. An instruction to generate a dataset is received. The first log data and the second log data are parameterized. A similarity between the first log data and the second log data based is determined at least in part on the parameterizing the first log data and the second log data. Based at least in part on the similarity between the first log data and the second log data, at least one of the first log data or the second log data from a dataset associated with a second vehicle is excluded.

20 Claims, 7 Drawing Sheets

DATASET GENERATION FROM CLUSTERED SCENARIOS FOR BALANCED MACHINE-LEARNED MODEL TRAINING

BACKGROUND

Training a machine-learned model may provide a valuable method for improving various components incorporated in autonomous vehicles, such as the prediction component, the perception component, or the like. However, the dataset used to train the machine-learned model can have an enormous amount of data (e.g., millions of data samples, or the like) which may occupy a significant amount of computing bandwidth and time. Such requirements for computing resources may increase the amount of time it takes to train or test a component, which may decrease the efficiency of improving components of the autonomous vehicle. Moreover, the dataset can include a tremendous number of data samples/portions that are similar to each other or relatively common, while including only a few data samples that relatively rarely occur. Because few of the rare data samples may be available, the machine-learned model may not adequately learn from such samples and may therefore be more inaccurate for similar scenarios when they're encountered during inference.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
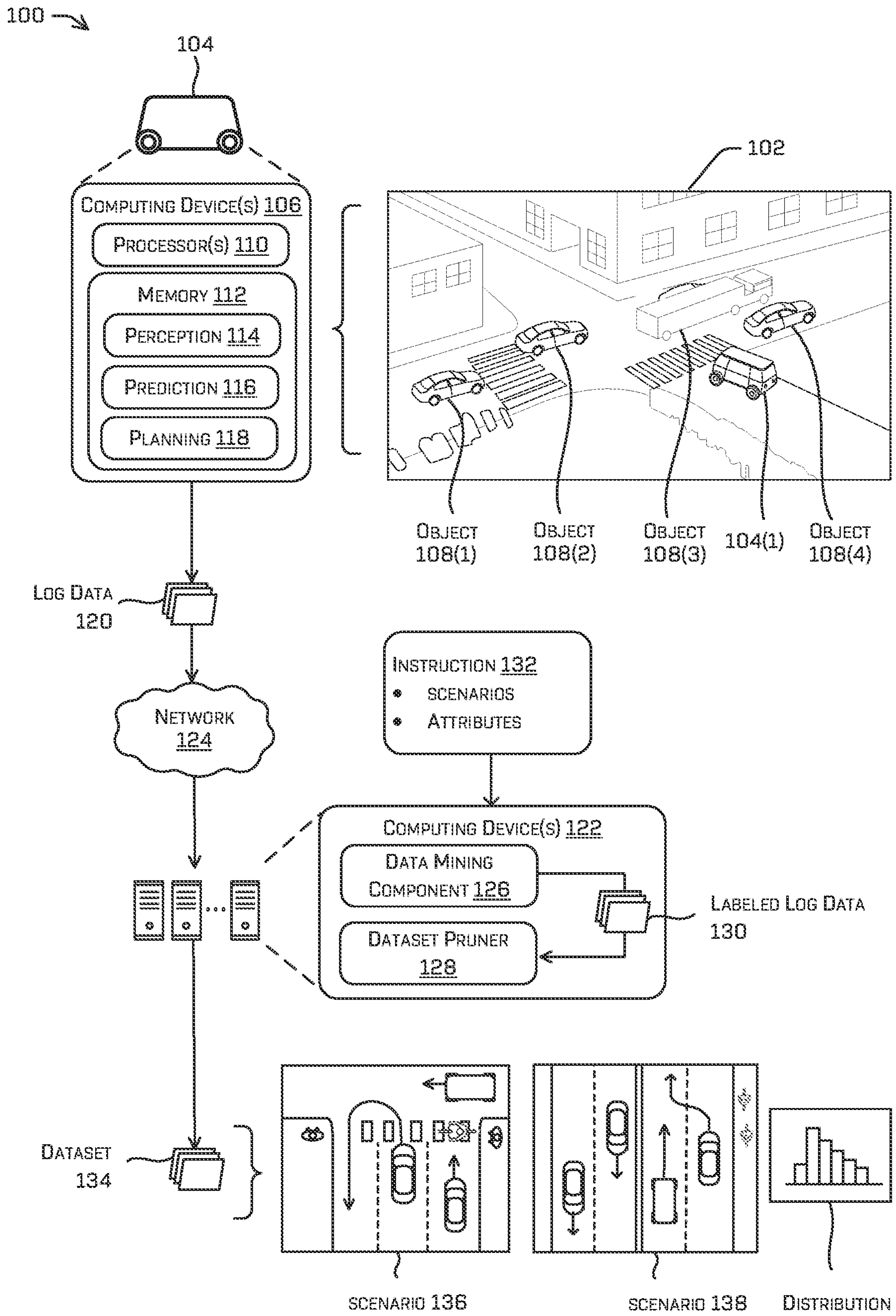
FIG. 1 illustrates a block diagram of an example autonomous vehicle and various data mining components and data that may be associated with such an autonomous vehicle as the autonomous vehicle navigates an environment.

The techniques discussed herein can improve the training of a machine learned model by balancing the training data used to train the machine-learned model, such that the amount of training data associated with common scenarios is reduced and the amount of training data associated with rare scenarios is relatively increased.

As described herein, log data can be collected by autonomous vehicles traveling in various environments, which may be associated with a geographical area. This log data may be used as part of the model training process. For example, a geographical area may refer to a region defined based on geographical area data. For example, San Francisco can be a geographical area, while Las Vegas can be another or the geographical area may include a neighborhood, a region of a city, an entire state, an entire country, or the like (or a combination thereof). An autonomous vehicle can detect its entering or exiting a geographical area based on map data, sensor data, third-party data, etc. In some examples, the log data can be generated by a simulation system. The log data can be developed from real-world driving events, for example, scenarios that may occur during real-world driving. The log data can include a series of ticks of data ordered in time, where an individual tick of data can be associated with labels. A tick of data can refer to a piece of data associated with a period of time such as 0.1 seconds, 0.5 seconds, 1 second, or the like.

The techniques discussed herein for balancing the dataset may include grouping similar scenarios as clusters. Techniques for generating datasets with clustered scenarios can include searching/scanning the log data to obtain data portions representing events. As described herein, an event can refer to an action or a status change of an object or an autonomous vehicle over a period of time (e.g., 2 seconds, 10 seconds, or the like). An event can be described by attributes such as a classification of the object (e.g., pedestrians, vehicles, cyclists, or the like), a maneuver of the object (e.g., changing lane, turning left, turning right, moving forward, parking, crossing the road, stopping, or the like), a maneuver of the autonomous vehicle (e.g., changing lane, turning left, turning right, moving forward, parking, or the like), a status associated with the object (e.g., a location of the object, a velocity of the object, a moving direction of the objection, a turning angle of the object, yaw, pitch, and roll rates, signage state (e.g., red light, passing permitted, lane closed) or the like), status associated with the autonomous vehicle (e.g., a location of the autonomous vehicle, a velocity of the autonomous vehicle, a moving direction of the autonomous vehicle, a turning angle of the autonomous vehicle, or the like), environmental attributes (e.g., road conditions on which the autonomous vehicle is traveling, weather conditions of the environment in which the autonomous vehicle is traveling, traffic conditions of the environment in which the autonomous vehicle is traveling, or the like), or the like. In some examples, a data sample representing an event can be associated with one or more labels based on the attributes of the event. In some examples, the labels can be metadata associated with the data portion representing the event. The labels may be generated based at least in part on the output of a perception component of the vehicle, by a simulation system, a machine-learning model trained to auto-label the events, and/or by a human.

In some examples, the data samples representing events can be aggregated to be a data portion representing a scenario. A scenario can include one or more events, a sequence of events, a confluence of events, or the like, which can be described by attributes such as geometric attributes (e.g., whether an event occurs in a junction, whether an event occurs in a particular geographical area, or the like), maneuver attributes (e.g., changing lanes, making a U-turn, or the like), an order of interactions (e.g., the autonomous vehicle follows an object, and then the object turns left, and then the autonomous vehicle stops following the object, or the like), or the like. In some examples, a scenario can include any number of objects such as static objects (e.g., buildings, bridges, signs, etc.) and/or dynamic objects such as other vehicles (e.g., cars, trucks, trains, etc.), pedestrians, bicyclists, or the like. In other words, the scenario may represent events of a similar kind. In some examples, the data portion representing a scenario can be associated with one or more labels based on the attributes. In some examples, a scenario can include any number of interactions between an autonomous vehicle and objects.

An interaction can refer to a situation where an autonomous vehicle and an object react to each other, which can include the autonomous vehicle and the object existing in a same region (e.g., a junction, a roadway associated with a city block, a segment of roadway) within a time period (e.g., several seconds). Additionally or alternatively, the interaction can be limited or defined by a maximum time duration (e.g., a maximum time duration between the time an object enters a junction and the time the object exits the junction, or the like), a maximum distance (e.g., a maximum distance between the position an object starts braking and the position the object fully stops, or the like), the time of an interaction (e.g., the time that passes for an object to merge into a lane, or the like), or the like.

The techniques may include a dataset pruner that may receive an instruction to generate a dataset for training or testing a component of an autonomous vehicle. In some examples, the instruction can include a specification for the scenarios to be generated. In some examples, the specification may indicate one or more attributes associated with the scenario. In response, the dataset pruner can generate the dataset based on the specification. For example, a user (e.g., a software developer, a vehicle designer, an engineer, or the like) can configure an instruction to generate a dataset with a particular distribution of an attribute of scenarios. More details regarding distributions of scenarios can be found in U.S. patent application Ser. No. 17/187,721, which is incorporated in its entirety herein.

The dataset pruner can scan the labeled log data for scenarios. In some examples, a dataset pruner may determine whether a portion of data satisfies the definition of the scenario indicated by the specification. In some examples, definitions of scenarios can be configured via a user interface (UI) presented by a computing device. In some examples, a dataset pruner can determine whether a portion of data represents a scenario based on the definition of the scenario. The dataset pruner can associate a scenario label with the scenario.

As such, the same and/or similar scenarios can be clustered by adding labels to data portions representing the same and/or similar scenarios. For example, a scenario in which an autonomous vehicle passes through a junction interacting with a big truck turning left, a scenario in which an autonomous vehicle turns left at a junction while a pedestrian is crossing the crosswalk, and a scenario in which an autonomous vehicle passing through a junction while a cyclist is passing through the junction are similar in that they both include an interaction between an autonomous vehicle with an object at a junction. Hence, both scenarios can be labeled as "autonomous vehicles interacting with objects at a junction." Moreover, all the scenarios in the log data that include an interaction between an autonomous vehicle with an object at a junction can be labeled as "autonomous vehicle interacting with objects at a junction." Similarly, scenarios that include an object making a U-turn can be labeled as "object making a U-turn," and scenarios that include an object changing lane with an autonomous vehicle passing through can be labeled as "object changing lane with an autonomous vehicle passing through," etc. The labels associated with the scenarios can also be referred to as scene types. As such, the scenarios are clustered based on types/labels, which makes it convenient to search for a particular type of scenario and to construct a dataset.

The dataset pruner can balance/prune the scenarios by configuring a distribution of the scenarios based on at least one attribute of the scenario. In some examples, the distribution of the scenarios can be based on the geographical areas in which an autonomous vehicle is operating. For example, a dataset pruner can balance a cluster of scenarios to include 20% scenarios in which a pedestrian is crossing the road while an autonomous vehicle is traveling in a geographical area of San Francisco, 30% scenarios in which a pedestrian is crossing the road while an autonomous vehicle is traveling in a geographical area of Las Vegas, and 50% scenarios in which a pedestrian is crossing the road while an autonomous vehicle is traveling in a geographical area of Los Angeles. To give another example, the dataset pruner can balance a cluster of scenarios to include 30% scenarios in which a pedestrian is crossing the road while the autonomous vehicle is about to enter a junction, 30% scenarios when a cyclist is crossing the road while the autonomous vehicle is about to enter the junction, and 40% scenarios when a vehicle crosses the junction while the autonomous vehicle is about to enter the junction.

In some examples, the balancing/pruning of the dataset can be based on the rareness scores of the driving scenarios. For example, a driving scenario can be associated with a rareness score that indicates the rareness of the driving scenario. For example, a rareness score of 1 can indicate that the driving scenario occurs relatively often. As another example, a rareness score of 8 can indicate that the driving scenario occurs relatively rarely. In some instances, there can be a threshold for the rareness scores. Rareness scores above the threshold may be considered rare, whereas rareness scores below the threshold can be considered common. In some examples, the balancing/pruning of the dataset can be based on rankings of the driving scenarios that indicate the difficulty of the driving scenario. The difficulty of the driving scenario can refer to how hard for a component to handle the driving scenario. For example, a driving scene with multiple objects closely around an autonomous vehicle can be hard for the autonomous vehicle to handle, while a driving scene with one object far away from the autonomous vehicle can be easy for the autonomous vehicle to handle. As another example, in a driving scene where the road has many turns, predictions can be hard for a prediction component. As another example, a ranking of 8 can indicate that the driving scenario is relatively difficult.

In an example instance, the dataset pruner can prune the dataset by selecting driving scenarios with designated rareness scores and/or rankings (e.g., below 3, above 4, between 5 and 7, or the like). Through the pruning methods discussed here, the data volume of the dataset can be significantly reduced with a balanced of driving scenarios. Because data portions representing driving scenarios with diversity can be selected by designating the rankings of the driving scenarios. Moreover, the training efficiency of the machined learned model using such a dataset can be improved. Because the training does not require the machined learned model to go through an enormous amount (e.g., 500 petabytes (PB)) of data to learn how to deal with different driving scenarios. Instead, the machined learned model can be trained with a relatively smaller amount of data (e.g., a few PB) to learn how to deal with various driving scenarios. The training time can be reduced, and the computing resources can be saved.

In some examples, a cluster of scenarios (such as scenarios associated with similar labels or the same label) can be sub-sampled to reduce the data volume. Subsampling refers to a method that reduces data size by selecting a subset of the original data. For example, a cluster of scenarios labeled as "interactions between an autonomous vehicle and an object at a junction" may include an enormous amount of data (e.g., 105 million data portions representing scenarios). The data generator can sub-sample the clustered scenarios to eliminate some repeated scenarios. In some examples, after sub-sampling, the data volume of the cluster of scenarios can be significantly reduced (e.g., from 105 million data portions to a few million data portions). The interval of sub-sampling can be configured arbitrarily or based on criteria. This subsampling may significantly reduce the time, computation, and energy usage for training the machine-learned model.

In some examples, the dataset pruner can prune the dataset by controlling the size of the dataset to meet a threshold (e.g., 100 PB, 10 PB, or the like). Moreover, there can be a threshold for an individual cluster of scenarios (e.g., 5 GB, 1 GB, or the like). For example, the dataset pruner can randomly select 50 PB data out of 100 PB data representing scenarios associated with the same label of "object changing lane with an autonomous vehicle passing through." In some instances, different pruning methods can be used individually or in combination for the dataset pruner to prune the dataset.

By balancing/pruning the scenarios, the diversity of scene types in a dataset can be improved. For example, a scenario that occurs rarely (e.g., with a chance of one in a million or the like) in the log data can be identified and added to the dataset. When training a component of the autonomous vehicle, the dataset with clustered scenarios can achieve the same or similar training results to running millions of data samples/portions. As such, the efficiency of training, testing, and/or validating components can be improved. Moreover, as a result of the scenario balancing, the resultant machine-learned model may perform more accurately for rare scenarios. In some examples, a user can update or construct a new instruction requiring different types of scenarios, and/or scenarios with different distributions. The dataset pruner does not need to regenerate the entire dataset, and the efficiency of generating datasets can be improved.

The techniques described herein can be implemented in a number of ways. Example implementations are provided below with reference to the following figures. Although discussed in the context of an autonomous vehicle, the techniques described herein can be applied to a variety of systems requiring control and/or interaction with objects in an environment, and are not limited to autonomous vehicles. In another example, the systems, methods, and apparatuses can be used in aviation or a nautical context. Additionally, the techniques described herein can be used with real data (e.g., captured using the sensor(s)), simulated data (e.g., generated by a simulator), or any combination of the two.

FIG. 1 illustrates a block diagram 100 of an example autonomous vehicle 104 and various data mining components and data that may be associated with such an autonomous vehicle 104 as the autonomous vehicle 104 navigates an environment. In some instances, vehicle 104 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 104 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 104 is depicted as a land vehicle, vehicle 104 may be a spacecraft, watercraft, and/or the like. In some examples, vehicle 104 may be represented in a simulation as a simulated vehicle, such as the vehicle representation 104(1) in a simulated representation. For simplicity, the discussion herein does not distinguish between a simulated vehicle and a real-world vehicle. References to a "vehicle" may therefore reference a simulated and/or a real-world vehicle.

The vehicle 104 can include a computing device(s) 106 that can perform operations such as detecting, identifying, segmenting, classifying, and/or tracking objects from sensor data captured in the environment 102. For example, the computing device associated with vehicle 104 can detect objects 108(1), 108(2), 108(3), and 108(4), and maneuvers/events (e.g., merging into a lane, moving forward, accelerating, decelerating, making a left turn, making a right turn, making a U-turning, parking, or the like) associated with objects 108(1), 108(2), 108(3), and 108(4). While 108(1), 108(2), 108(3), and 108(4) are depicted as vehicles in the environment 102, 108(1), 108(2), 108(3), and 108(4) could additionally or alternatively include cyclists, pedestrians, animals, and/or other objects.

The vehicle computing device 106 can include one or more processor(s) 110 and memory 112 communicatively coupled to the one or more processor(s) 110. The one or more processor(s) 110 can include, for example, one or more FPGAs, SoCs, ASICs, and/or CPUs. The vehicle 104 can traverse through the environment 102 and determine and/or capture data. For example, the vehicle computing device 106 can determine vehicle status data, vehicle diagnostic data, vehicle metrics data, and/or map data. In some instances, the vehicle 104 can include one or more sensors where the one or more sensors (not shown) can include one or more time-of-flight sensors, lidar sensors, radar sensors, sonar sensors, image sensors, audio sensors, infrared sensors, location sensors, wheel encoders, IMUs, etc., or any combination thereof, although other types of sensors are contemplated.

The computing device(s) 106 can include one or more sensors (not shown), a perception component 114, a prediction component 116 (e.g., Universal Active Prediction (UAP) model), and a planning component 118. The perception component 114, the prediction component 116, and/or the planning component 118 may include one or more machine-learned (ML) models and/or other computer-executable instructions. As the vehicle 104 traverses through the environment 102, the sensors can capture sensor data associated with the environment 102. For example, and as discussed above, some of the sensor data can be associated with objects (e.g., vehicles, cyclists, pedestrians, etc.). In some instances, the sensor data can be associated with other objects including, but not limited to, buildings, road surfaces, signage, barriers, etc. Therefore, in some instances, the sensor data can be associated with dynamic objects and/or static objects. The dynamic objects can be objects that are associated with a movement (e.g., vehicles, motorcycles, cyclists, pedestrians, animals, etc.) or capable of a movement (e.g., parked vehicles, standing pedestrians, etc.) within the environment 102. The static objects can be objects that are associated with the environment 102 such as, for example, buildings/structures, road surfaces, road markers, signage, barriers, trees, sidewalks, etc. In some instances, the vehicle computing device 106 can determine data associated with the objects in the environment, such as speed data, turning angle data, acceleration data, deceleration data, pitch, roll, and yaw data, and the like.

The perception component 114 may determine what is in the environment surrounding the vehicle 104 (or during a simulation what is in the simulated environment). In some instances, the perception component 114 can also determine pose data associated with a position of the vehicle 104. For example, the perception component 114 can use the sensor data to determine position data, coordinate data, and/or orientation data of the vehicle 104 in the environment 102. In some instances, the pose data can include x-y-z coordinates and/or can include pitch, roll, and yaw data associated with the vehicle 104. In some instances, the perception component 114 may determine data related to objects (or simulated objects) in the vicinity of the vehicle 104 (e.g., classifications associated with detected objects, instance segmentation(s), tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. In some examples, the objects surrounding the vehicle 104 may be simulated objects of a simulated environment. The data produced by the perception component 114 may be collectively referred to as "perception data." Once the perception component 114 has generated perception data, the perception component 114 may provide the perception data to the planning component 118. In some examples, the perception data may be used as part of labeling the scenarios discussed herein.

The prediction component 116 may determine predicted data associated with an object in the environment 102 (or during a simulation what is in the simulated environment), such as a predicted future position, orientation, velocity, acceleration, or the like. This predicted data and/or historical data associated with an object may be amalgamated as a track in association with the object. In some examples, the prediction data may be additionally or alternatively based at least in part on map data or other data. In some examples, the prediction data may comprise a top-down segmentation of the environment, as described in more detail in U.S. patent application Ser. No. 15/963,833, which is incorporated in its entirety herein, and/or a top-down prediction associated with the environment, as described in more detail in U.S. patent application Ser. No. 16/779,576, which is incorporated in its entirety herein. In some examples, prediction data generated by the prediction component 116 may be used as part of labeling the scenarios discussed herein.

The planning component 118 can use the sensor data to generate a trajectory for the vehicle 104. The planning component 118 may determine how to operate the vehicle 104 (or control the vehicle representation 104 in a simulation) according to information received generated by other components such as the perception component 114 and the prediction component 116. In some examples, planning data generated by the planning component 118 may be used as part of labeling the scenarios discussed herein.

The vehicle computing device 106 can generate log data 120. For example, the log data 120 can include the sensor data, perception data, prediction data, planning data, vehicle status data, velocity data, intent data, and/or other data generated by the vehicle computing device 106 during operation including, but not limited to, control messages, error messages, etc. In some instances, the sensor data can include data captured by sensors such as time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor data can be data captured by such sensors such as time-of-flight data, location data, lidar data, radar data, sonar data, image data, audio data, etc. In some instances, the log data 120 can include time data that is associated with the other data generated by the vehicle computing device.

The log data 120 can include data portions representing various events in the environment 102 along a timeline. An event can include various statuses, actions, and/or interactions of objects (e.g., object classifications, maneuvers represented by captured sensor data, planner decisions, or the like) at individual time points or over time.

The vehicle 104 can transmit the log data 120 or portions of the log data 120 to a computing device(s) 122 via network 124. For example, the vehicle 104 can transmit log data 120 which includes sensor data, time data, perception data, prediction data, planning data, and/or map data to the computing device(s) 122 to store the log data 120. In some examples, the log data 120 can include map data and location data indicating a region such as an environment 102 and how the vehicle 104 traversed through the region. Additionally, the log data 120 can include status data of the vehicle 104, including but not limited to acceleration data, steering angle data, indicator status data, etc. as the vehicle 104 traversed through the region. The log data 120 can include time data that associates actions of the vehicle 104 and observations (e.g., sensor data) with a set of timestamps.

Examples of data generated by a vehicle that can be included in the log data 120 can be found, for example, in U.S. patent application Ser. No. 15/644,267 titled "Interactions Between Vehicle and Teleoperations System" and filed Jul. 7, 2017 (describing, in part, communication signals that can include sensor data and data indicating an occurrence of an event as well vehicle control data that can be derived from data received from a sensor and a planner, an object data calculator, an object classifier, a collision predictor system, a kinematics calculator, a safety system actuator, and a control operation of the drive system), U.S. patent application Ser. No. 15/693,700 titled "Occupant Protection System Including Expandable Curtain and/or Expandable Bladder" and filed Sep. 1, 2017 (describing, in part, data representative of a trajectory of the vehicle, location data, object data, and vehicle control data), and U.S. patent application Ser. No. 16/198,653 titled "Executable Component Interface and Controller" filed Nov. 21, 2018 (describing, in part, a type of log data), which are each incorporated by reference in their entirety and for all purposes. In some instances, the computing device(s) 122 can include a server that stores the log data 120 in a database. Such transmission can be wired, wireless, or otherwise, as described in detail herein.

The computing device(s) 122 can include a data mining component 126 and a dataset pruner 128. In some examples, the data mining component 126 can search/scan the log data 120 to determine one or more events (e.g., an object braking associated with a deceleration above a threshold value, pedestrians crossing a crosswalk, an autonomous vehicle navigating around double-parked vehicles, an object making a U-turn, or the like). For example, the data mining component 126 may define an event based on attributes such as an environmental layout, a type, statues, maneuver, and position of the object(s) in the environment, or the like. The data mining component 126 may identify one or more portions of log data representing the event based on the definition. For example, the data mining component 126 can determine a portion of data representing an event of an object making a lane change. The data mining component 126 may determine a set of attributes/parameters to represent the characteristics of an event. Note that, although the events may be determined from log data, they may also be defined based at least in part on user input, procedurally generated, or the like.

The data mining component 126 can determine attributes/parameters associated with events, such as a classification of the object (e.g., pedestrians, vehicles, cyclists, or the like), a maneuver of the object (e.g., changing lane, turning left, turning right, moving forward, parking, crossing the road, stopping, or the like), a maneuver of the autonomous vehicle (e.g., changing lane, turning left, turning right, moving forward, parking, or the like), a status associated with the object (e.g., a location of the object, a velocity of the object, a moving direction of the objection, a turning angle of the object, yaw, pitch, and roll rates, or the like), status associated with the autonomous vehicle (e.g., a location of the autonomous vehicle, a velocity of the autonomous vehicle, a moving direction of the autonomous vehicle, a turning angle of the autonomous vehicle, or the like), environmental attributes (e.g., road conditions on which the autonomous vehicle is traveling, weather conditions of the environment in which the autonomous vehicle is traveling, traffic conditions of the environment in which the autonomous vehicle is traveling, or the like), timestamps, or the like. In some examples, the data mining component may assign a rarity score to an event that occurs with a likelihood under a threshold (e.g., 1/1000, 1/10,000, or the like).

The data mining component 126 can associate one or more labels with the data portion representing an event based on the attributes of the event. For example, the data mining component 126 can determine that a portion of data representing an event of the U-turn maneuver of an object, and can associate a label "object making a U-turn" with the portion of data representing the event. As another example, the data mining component 126 can determine that a portion of data representing a double parked vehicle (DPV) on the road, and can associate a label "DPV" with the portion of data representing the event. In some examples, the labels can be metadata associated with the data portion representing the event. The data mining component 126 can output labeled log data 130 with portions of data representing various events.

In some examples, data mining component 126 can be configured to identify and tag multiple types of events in the log data together. Additionally or alternatively, the data mining component 126 can include multiple data mining units, where a respective data mining unit can be configured to identify and label a type of event based on a set of rules. In practice (e.g., to mine logged data to find examples of discrete portions of log useful for training or validation of machine-learned models used for vehicles), data mining component may include independent rules for determining useful discrete portions. For example, a first data mining unit can scan the log data to identify and label portions of data representing the event of a "car making a U-turn" based on a first set of rules. The first set of rules can include an object classification being a car, a maneuver of the object being a U-turn, or the like. As another example, a second data mining unit can scan the log data to identify and label portions of data representing the event of "pedestrian crossing the road" based on a second set of rules. The second set of rules can include an object classification being a pedestrian, a maneuver of the object crossing the road, or the like. In practice, the different sets of rule/mining units can be configured to capture different scenarios independently and may be specified by different developers and at different times. This can result in duplicative or over-represented examples in datasets from log data as each of the sets of rules/mining units may independently search for interesting portions of the same log data using different criteria. This can lead to overfitting or biasing of machine-learned models trained using such datasets, duplicative examples being included in such datasets (resulting in unnecessarily large datasets), inadequate verification testing, etc. The disclosed techniques can be used to automatically identify duplicative portions of logs to prevent their use in a generated dataset and/or remove them from an existing dataset.

The labeled log data 130 can be used by the dataset pruner 128 to generate datasets that include various scenarios. The dataset pruner 128 can search/scan the labeled log data 130 to determine portions of data representing scenarios. A scenario can include one or more events, a sequence of events, a confluence of events, or the like. In some examples, the dataset pruner 128 can aggregate data portions representing events to be a data portion representing a scenario. For example, to search for a scenario in which an object makes a U-turn while an autonomous vehicle is in a junction, the dataset pruner 128 can search for a data portion representing an event of an object making a U-turn and a data portion representing an event of the autonomous vehicle in a junction, and can aggregate the data portions representing events into a portion of data representing the scenario, where such events can overlap fully or partially in time (e.g., within a threshold time period such as 5 seconds, 10 seconds, or the like) and proximate in space (e.g., within a threshold range of distance such as 0.5 miles, 1 mile, or the like). When searching the labeled log data 130 for events, the dataset pruner 128 can search for events with labels such as "object making a U-turn," "big trucks," "pedestrian crossing the road," or the like associated with portions of data representing the events.

The dataset pruner 128 can determine attributes associated with a scenario such as geometric attributes (e.g., whether an event occurs in a junction, whether an event occurs in a particular geographical area, or the like), maneuver attributes (e.g., changing lanes, making a U-turn, following an object, or the like), an order of interactions (e.g., the autonomous vehicle follows an object, and then the object turns left, and then the autonomous vehicle stops following the object, or the like), or the like. In some examples, a scenario can include any number of objects such as static objects (e.g., buildings, bridges, signs, etc.) and/or dynamic objects such as other vehicles (e.g., cars, trucks, trains, etc.), pedestrians, bicyclists, or the like.

In some examples, a scenario can include any number of events with interactions between an autonomous vehicle and objects. The dataset pruner 128 can determine attributes related to the interaction, for example, a maximum time duration of the interaction (e.g., a maximum time duration between the time an object enters a junction and the time the object existing the junction, or the like), a maximum distance of the interaction (e.g., a maximum distance between the position an object starts braking and the position the object fully stops, or the like), the time period of the interaction (e.g., the time for an object to merge into a lane, or the like), or the like.

The dataset pruner 128 can associate the data portion representing a scenario with one or more labels based on the attributes. For example, the dataset pruner 128 can associate the label "object making a U-turn when an autonomous vehicle is in a junction" with a data portion representing a scenario in which an object making a U-turn when an autonomous vehicle is in a junction. In some examples, the labels can be metadata associated with the data portion representing the scenario.

In some examples, the dataset pruner 128 can associate a label that is representative of the scenario. For example, in a scenario, there can be a big truck, an object making a U-turn, an autonomous vehicle passing through a junction, a pedestrian crossing the road, or the like. The dataset pruner 128 dataset pruner 310 can generate a label "an object making a U-turn while an autonomous vehicle is passing through a junction" to be associated with the portion of data representing the scenario to be representative of the scenario. In some examples, the label can be changed and/or updated based on the specification of the instruction.

The dataset pruner 128 can receive an instruction 132 to generate a dataset. In some examples, the dataset can be used for training, testing, and/or validating a component of an autonomous vehicle, such as the perception component, the prediction component, or the like. Additionally, the dataset can be used by a simulation system that can run simulations of the driving environment. In some examples, the instruction 132 can include a specification of scenarios with various attributes. For example, the instruction 132 can require scenarios with an object making a U-turn while an autonomous vehicle is at a junction. In some examples, the instruction 132 can include a specification related to the distribution of the scenarios. For example, the instruction 132 can require a dataset with 10% scenarios in which a pedestrian is crossing the road when an autonomous vehicle is passing through a junction, 60% scenarios in which an object is making a U-turn when an autonomous vehicle is passing through a junction, and 30% scenarios where an object is turning left when an autonomous vehicle is passing through a junction. In some examples, the instruction 132 can be configured by a user (e.g., a software developer, a vehicle designer, an engineer, or the like), a computing device, a piece of code, or the like.

In response to the instruction, the dataset pruner 128 can generate the dataset 134 including various scenarios (e.g., scenario 136, scenario 138, or the like). For example, the instruction 132 can require scenarios in which an object merges into a lane where an autonomous vehicle is traveling. The dataset pruner 128 can search/scan the labeled log data 130 for events labeled as "object merging into a lane" and "autonomous vehicle traveling in the lane," where such events can overlap fully or partially in time (e.g., within a threshold time period such as 5 seconds, 10 seconds, or the like) and proximate in space (e.g., within a threshold range of distance such as 0.5 miles, 1 mile, or the like). The dataset pruner 128 can aggregate such events into a scenario, and associate a label "object merging into a lane where an autonomous vehicle is traveling" with the portion of data representing the scenario. The dataset pruner 128 can put up together all the scenes determined as "object merging into a lane where an autonomous vehicle is traveling" into dataset 134.

The dataset pruner 128 can prune the dataset. Various methods can be used to perform the pruning of the dataset. In some examples, the pruning of the dataset can be performed based on a threshold for the size of the dataset. For example, the threshold of the size of the dataset can be 100 GB, 500 GB, or the like. Additionally or alternatively, different thresholds can be set for different types of driving scenarios. For example, the threshold for a driving scenario of "object merging into the lane" can be 5 GB. For another example, the threshold for a driving scenario of "object stopping in a junction in San Francisco" can be 10 GB. In some instances, the threshold of the size of the dataset and/or respective type of driving scenario can be set by a user, a simulation system, and/or a machine-learning model trained to set the threshold. In an example instance, the dataset pruner 128 can prune the dataset to ensure that the size of the dataset is equal to or less than the threshold. Additionally or alternatively, the dataset pruner 128 can prune the dataset to ensure that the size of an individual type of driving scenario is equal to or less than the individual threshold of the driving scenario. By constraining the size of the dataset, the training efficiency of the machine learned model can be improved, and the training time and computing resources can be saved.

In some examples, the pruning of the dataset can be performed based on the rareness scores of the driving scenarios. For example, a driving scenario can be associated with a rareness score. The rareness scores can be represented by numbers (e.g., 1, 2, 3, or the like), letters (e.g., A, B, C, or the like), codes, symbols, etc. The rareness score can indicate the rareness of the driving scenario. For example, a rareness score of 1 can indicate that the driving scenario occurs relatively often. As another example, a rareness score of 8 can indicate that the driving scenario occurs relatively rarely. Through the pruning methods discussed here, the data volume of the dataset can be significantly reduced without reducing the presence of rare data in the dataset. Because data portions representing driving scenarios that occur rarely can be kept in the dataset by designating the rankings of the driving scenarios. Moreover, the training efficiency of the machined learned model using such a dataset can be improved. Because the training does not require the machined learned model to go through an enormous amount (e.g., 500 PB) of data to learn how to deal with a rare driving scenario. Instead, the machined learned model can be trained with a relatively smaller amount of data (e.g., a few PB) to learn how to deal with rare driving scenarios. The training time can be reduced, and the computing resources can be saved.

In some examples, the pruning of the dataset can be performed based on rankings of the driving scenarios. The ranking can indicate the difficulty of the driving scenario. The difficulty of the driving scenario can refer to how hard for a component to handle the driving scenario. For example, a driving scene with multiple objects closely around an autonomous vehicle can be hard for the autonomous vehicle to handle, while a driving scene with one object far away from the autonomous vehicle can be easy for the autonomous vehicle to handle. As another example, in a driving scene where the road has many turns, predictions can be hard for a prediction component. The rankings can be represented by numbers (e.g., 1, 2, 3, or the like), letters (e.g., A, B, C, or the like), codes, symbols, etc. For example, a ranking of 1 can indicate that the driving scenario is not difficult. As another example, a ranking of 8 can indicate that the driving scenario is relatively difficult. In an example instance, the dataset pruner 128 can prune the dataset by selecting driving scenarios designated rankings (e.g., below 3, above 4, between 5 and 7, or the like). Through the pruning methods discussed here, the data volume of the dataset can be significantly reduced with balanced difficulties of driving scenarios. Because data portions representing driving scenarios with different difficulties can be selected by designating the rankings of the driving scenarios. Moreover, the training efficiency of the machined learned model using such a dataset can be improved. Because the training does not require the machined learned model to go through an enormous amount (e.g., 500 PB) of data to learn how to deal with a difficult driving scenario. Instead, the machined learned model can be trained with a relatively smaller amount of data (e.g., a few PB) to learn how to deal with driving scenarios with different difficulties. The training time can be reduced, and the computing resources can be saved.

In some examples, the pruning of the dataset can be performed based on similarities of the driving scenarios. As described above, driving scenarios that are similar to each other can be associated with the same label. For example, a first driving scenario with a big truck making a U-turn can be associated with the label "object making a U-turn," and a second driving scenario with a car making a U-turn can also be associated with the label "object making a U-turn." To reduce the dataset volume, the dataset pruner 128 can select a number of driving scenarios out of the driving scenarios that are similar and associated with the same label. For example, for 1 million driving scenarios associated with the label of "object changing lane with an autonomous vehicle passing through" the dataset pruner 128 can select 500 driving scenarios out of the 1 million driving scenarios associated with the label of "object changing lane with an autonomous vehicle passing through." The selection can be performed randomly by subsampling, or the like. Through the pruning methods discussed here, the data volume of the dataset can be significantly reduced without losing the diversity of the data. Because data portions representing similar or repeating driving scenarios can be reduced and/or eliminated. Moreover, the training efficiency of the machined learned model using such a dataset with diversity and reduced size can be improved. Because the training does not require the machined learned model to be trained with an enormous amount (e.g., 500 PB) of data with a lot of similar or repeating data. Instead, the machined learned model can learn a variety of driving scenarios using a relatively smaller amount of data. The training time can be reduced, and the computing resources can be saved.

In some instances, different pruning methods can be used individually or in combination for the dataset pruner 128 to prune the dataset. For example, the dataset pruner 128 can prune the dataset based on the threshold of the size of the dataset and can select driving scenarios with a ranking above 8 associated with the same label. As another example, the dataset pruner 128 can prune the dataset by discarding the driving scenarios with rankings lower than 3 and can subsample the driving scenarios with a ranking over 8 to make sure that the threshold of the size of the dataset is met.

In some examples, the dataset pruner 128 can prune/balance the dataset 134 to include scenarios with a particular distribution. For example, the dataset 134 can include 20% scenarios in which a pedestrian is crossing the road when an autonomous vehicle is moving along the road, 30% scenarios in which an object is making a U-turn while an autonomous vehicle is at a junction, and 50% scenarios where an object is merging into a lane in which an autonomous vehicle is traveling.

In some examples, the dataset pruner 128 can prune the dataset 134 by sub-sampling the dataset 134 to reduce the data amount of the dataset 134. For example, the dataset 134 can include millions of data samples, and the dataset pruner 128 can sub-sample the dataset 134 such that a number of repeating data portions representing the same scenarios can be eliminated. Subsampling refers to a method that reduces data size by selecting a subset of the original data. For example, a cluster of scenarios labeled as "interactions between an autonomous vehicle and an object at a junction" may include an enormous amount of data (e.g., 105 million data portions representing scenarios). The dataset pruner 128 can sub-sample the clustered scenarios to eliminate some repeating scenarios. In some examples, after sub-sampling, the data volume of the cluster of scenarios can be significantly reduced (e.g., from 105 million data portions to a few millions of data portions). The interval of sub-sampling can be configured arbitrarily or based on criteria.

Figure 2:
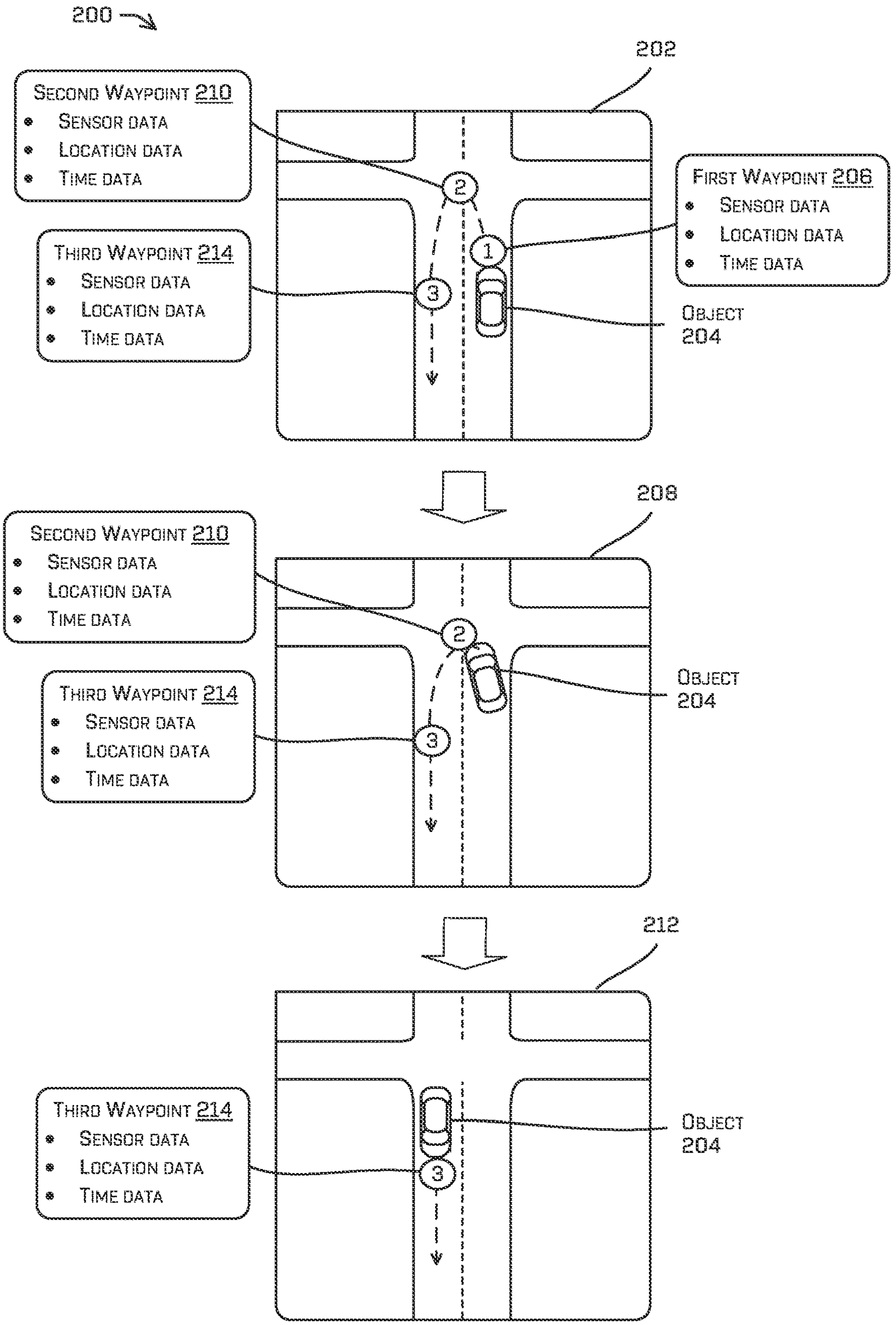
FIG. 2 illustrates a flow diagram of an example process for identifying an event based on log data in an example scenario.

FIG. 2 illustrates a flow diagram of an example process 200 for identifying an event based on log data in an example scenario. In some examples, a data mining component (e.g., the data mining component 126 described with respect to FIG. 1) may identify one or more events based at least in part on the log data (e.g., the log data 120 described with respect to FIG. 1) and definitions of events. A definition of an event may define an environmental layout, a number, type, and a configuration of object(s) in the environment, a maneuver of an object, a maneuver of an autonomous vehicle, a relative position of the object with respect to the autonomous vehicle, an interaction between the object and the autonomous vehicle, or the like. Note that, although events may be determined from log data, they may also be defined based at least in part on user input, procedurally generated, or the like.

As an example, a definition for a U-turn event can be a turning of a vehicle or an object in a U-shaped course to face in the opposite direction within a period of time (e.g., 5 seconds, 10 seconds, or the like). At 202, the data mining component can determine that at a first waypoint 206, an object 204 is moving forward along the road based on sensor data, location data, time data, or the like included in the log data. At 208, the data mining component can determine that the object 204 is turning to the left at a second waypoint 210 based on sensor data, location data, time data, or the like included in the log data. At 212, the data mining component can determine that the object 204 is turning to an opposite direction at a third waypoint 214 based on sensor data, location data, time data, or the like included in the log data. The data mining component can determine that the action of the object 204 is a U-turn and associate a label "object making U-turn" to the portion of data representing the event. As such, the data mining component can run through the log data to identify the U-turn events and associate labels with the portions of data representing U-turn events.

Similarly, the data mining component can search/scan the log data for other events (e.g., pedestrian crossing the road, double parking vehicle, object making a lane change, or the like), and associate labels with the portions of data representing such events. In some examples, various events can overlap fully or partially in time (e.g., within a threshold time period such as 5 seconds, 10 seconds, or the like) and proximate in space (e.g., within a threshold range of distance such as 0.5 miles, 1 mile, or the like). For example, an object can make a U-turn when an autonomous vehicle is passing through a junction. In some examples, a series of events can occur in sequence. For example, an autonomous vehicle follows an object, and then the object turns left, and then the autonomous vehicle stops following the object. In some examples, the data mining component can output labeled log data including labeled events for further processing.

Figure 3:
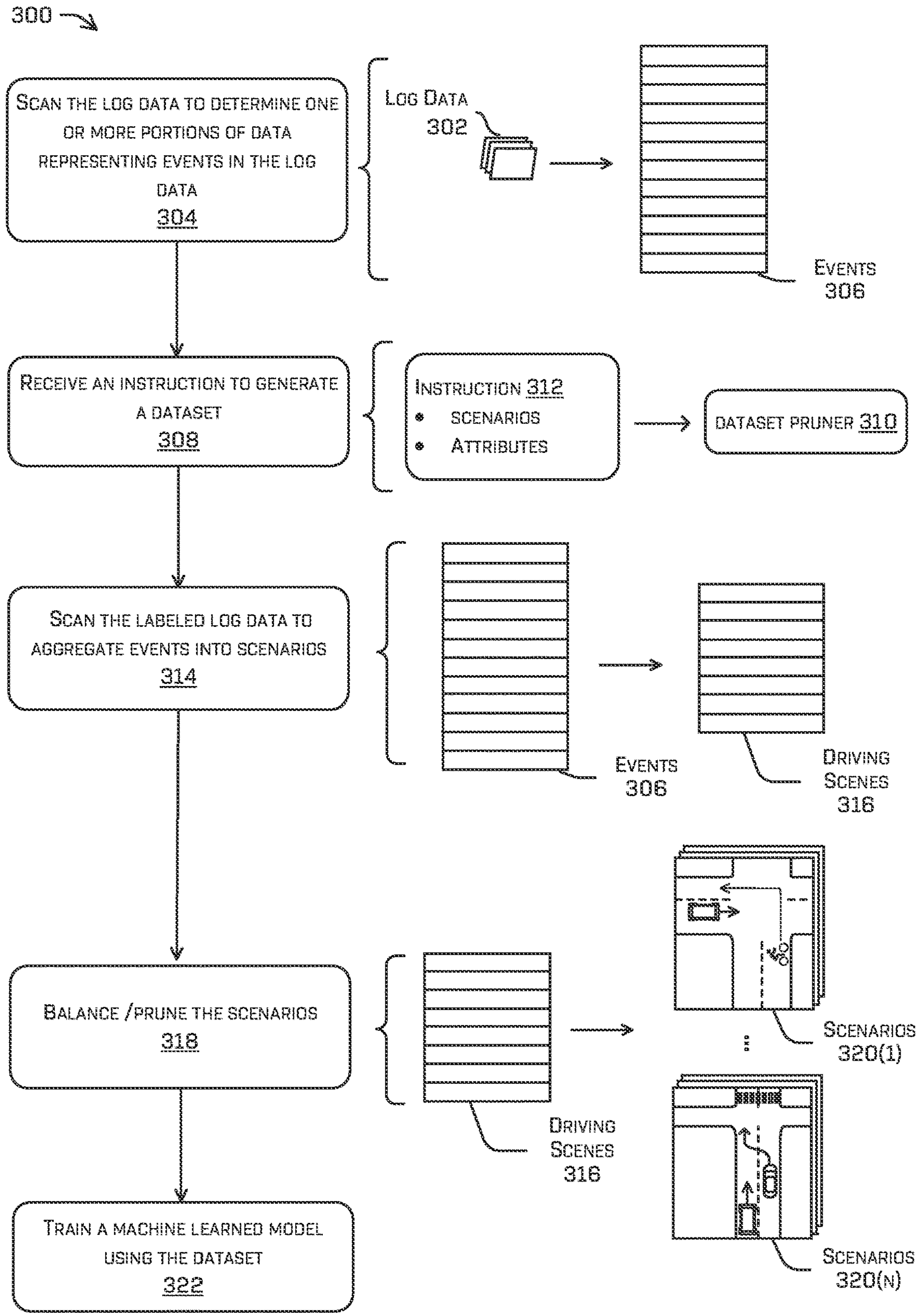
FIG. 3 illustrates a pictorial flow diagram of an example process for generating a dataset based at least in part on log data.

FIG. 3 illustrates a pictorial flow diagram of an example process 300 for generating dataset based at least in part on log data 302. In some examples, example process 300 may occur at a computing device(s) 122 described with respect to FIG. 1. In an additional or alternate example, the example process 300 may occur at the data mining component 126 and the dataset pruner 128 described with respect to FIG. 1.

At operation 304, example process 300 may comprise scanning, by a data mining component, the log data 302 to determine one or more portions of data representing events 306 in the log data 302. An event can be an action or status change of an object or an autonomous vehicle. Examples of events can include an object braking associated with a deceleration above a threshold value, pedestrians crossing a crosswalk, an autonomous vehicle navigating around double-parked vehicles, an object making a U-turn, or the like.

The data mining component can determine attributes/parameters associated with events 306, such as a classification of the object, a maneuver of the object, a maneuver of the autonomous vehicle, a status associated with the object, status associated with the autonomous vehicle, environmental attributes, or the like. The data mining component can associate one or more labels with the data portion representing an event based on the attributes of the event. For example, the data mining component can associate a label "object making a U-turn" with a portion of data representing an event where an object makes a U-turn. For example, the data mining component can associate a label "big truck" with a portion of data representing an event where a big truck shows up. For example, the data mining component can associate a label "pedestrian crossing the road" with a portion of data representing an event where a pedestrian is crossing the road. In some examples, the labels can be metadata associated with the data portion representing the event. The data mining component can output labeled log data for further processing.

At operation 308, example process 300 may comprise receiving, by a dataset pruner 310, an instruction 312 to generate a dataset for training, testing, and/or validating a component of an autonomous vehicle. In some examples, the instruction 312 may include or be accompanied with specification s of scenarios. For example, the instruction 312 may require scenarios that occur in a geographical area of Las Vegas with an object making a lane change maneuver. In some examples, the instructions may include or be accompanied with a probability distribution (a "distribution") of the scenarios based on one or more attributes of the scenario. For example, the instruction 312 may require 20% scenarios in which a pedestrian is crossing the road when an autonomous vehicle is traveling in a geographical area of San Francisco, 30% scenarios in which a pedestrian is crossing the road in a geographical area of Las Vegas, and 50% scenarios in which a pedestrian is crossing the road in a geographical area of Los Angeles. In some examples, the instruction 132 can be configured by a user (e.g., a software developer, a vehicle designer, an engineer, or the like), a computing device, a piece of code, or the like.

At operation 314, example process 300 may comprise scanning, by the dataset pruner 310, the labeled log data to aggregate events into scenarios 316 based at least in part on the instruction 312. A scenario can include one or more events, a sequence of events, a confluence of events, or the like. In some examples, a dataset pruner can aggregate data portions representing events to be a data portion representing a scenario. For example, to search for a scenario "object merging into a lane while an autonomous vehicle is traveling in the lane," the dataset pruner 310 can search/scan the labeled log data for events labeled as "object merging into a lane" and "autonomous vehicle traveling in the lane," where such events can overlap fully or partially in time (e.g., within a threshold time period such as 5 seconds, 10 seconds, or the like) and proximate in space (e.g., within a threshold range of distance such as 0.5 miles, 1 mile, or the like). The dataset pruner 310 can aggregate such events into a scenario, and associate a label "object merging into a lane where an autonomous vehicle is traveling" with the portion of data representing the scenario. As another example, to search for a scenario "cyclist turning left while an autonomous vehicle is passing a junction," the dataset pruner 310 can search/scan the labeled log data for events labeled as "cyclist turning left" and "autonomous vehicle passing a junction," where such events can overlap fully or partially in time (e.g., within a threshold time period such as 5 seconds, 10 seconds, or the like) and proximate in space (e.g., within a threshold range of distance such as 0.5 miles, 1 mile, or the like). The dataset pruner 310 can aggregate such events into a scenario, and associate a label "cyclist turning left while an autonomous vehicle is passing a junction" with the portion of data representing the scenario.

As such, the same and/or similar scenarios can be clustered by adding labels to data portions representing the same and/or similar scenarios. For example, a scenario in which an autonomous vehicle passes through a junction interacting with a big truck turning left, a scenario in which an autonomous vehicle turns left at a junction while a pedestrian is crossing the crosswalk, and a scenario in which an autonomous vehicle passing through a junction while a cyclist is passing through the junction are similar in that they both include an interaction between an autonomous vehicle with an object at a junction. Hence, both scenarios can be labeled as "autonomous vehicles interacting with objects at a junction." Moreover, all the scenarios in the log data that include an interaction between an autonomous vehicle with an object at a junction can be labeled as "autonomous vehicle interacting with objects at a junction." Similarly, scenarios that include an object making a U-turn can be labeled as "object making a U-turn," and scenarios that include an object changing lane with an autonomous vehicle passing through can be labeled as "object changing lane with an autonomous vehicle passing through," etc. The labels associated with the scenarios can also be referred to as scene types. As such, the scenarios are clustered based on types/labels, which makes it convenient to search for a particular type of scenario and to construct a dataset.

In some examples, there may be several events in a scenario, and the dataset pruner 310 can generate a label representing the significant event in the scene, or reflective of the specification in the instruction 312, omitting other events and/or objects. For example, in a scenario, there can be a big truck, an object making a U-turn, an autonomous vehicle passing through a junction, a pedestrian crossing the road, or the like. The dataset pruner 310 can generate a label "an object making a U-turn while an autonomous vehicle is passing through a junction" to be associated with the portion of data representing the scenario to be representative of the scenario. In some examples, the label can be changed and/or updated based on the specification of the instruction.

At operation 318, example process 300 may comprise balancing/pruning the scenarios 316. Various methods can be used to perform pruning of scenarios 316 in the dataset to generate clustered scenarios (e.g., scenarios 320(1), . . . , scenarios 320 (*n*), where n is a positive integer). For example, the clustered scenarios can be similar to each other and associated with the same scenario label. As an example, scenarios 320(1) can be associated with the scenario label of "vehicle passing through a junction while a cyclist is turning left," and scenarios **320(*n*)** can be associated with the scenario label of "an object on an adjacent lane merging into the lane in which the vehicle is traveling."

In some examples, the dataset pruner can prune the dataset by configuring a distribution of the scenarios based on at least one attribute of the scenario. In some examples, the distribution 320 of the scenarios can be based on geographical areas in which an autonomous vehicle is operating. For example, a dataset pruner can balance a cluster of scenarios to include 20% scenarios in which a pedestrian is crossing the road while an autonomous vehicle is traveling in a geographical area of San Francisco, 30% scenarios in which a pedestrian is crossing the road while an autonomous vehicle is traveling in a geographical area of Las Vegas, and 50% scenarios in which a pedestrian is crossing the road while an autonomous vehicle is traveling in a geographical area of Los Angeles.

In some examples, the distribution 320 of the scenarios can be based on an integration type of an autonomous vehicle and an object. For example, a dataset pruner can balance a cluster of scenarios to include 20% scenarios in which a pedestrian is crossing the road when an autonomous vehicle is moving along the road, 30% scenarios in which an object is making a U-turn while an autonomous vehicle is at a junction, and 50% scenarios where an object is merging into a lane in which an autonomous vehicle is traveling.

In some examples, the pruning of the dataset can be performed based on a threshold for the size of the dataset. For example, the threshold of the size of the dataset can be 100 GB, 500 GB, or the like. Additionally or alternatively, different thresholds can be set for different types of driving scenarios. For example, the threshold for a driving scenario of "object merging into the lane" can be 5 GB. For another example, the threshold for a driving scenario of "object stopping in a junction in San Francisco" can be 10 GB. In some instances, the threshold of the size of the dataset and/or each type of driving scenario can be set by a user, a simulation system, and/or a machine-learning model trained to set the threshold. In an example instance, the dataset pruner 310 can prune the dataset to ensure that the size of the dataset is equal to or less than the threshold. Additionally or alternatively, the dataset pruner 310 can prune the dataset to ensure that the size of an individual type of driving scenario is equal to or less than the individual threshold of the driving scenario. By controlling the size of the dataset, the training efficiency of the machine learned model can be improved, and the training time and computing resources can be saved.

In some examples, the pruning of the dataset can be performed based on the rareness scores of the driving scenarios, rankings of the driving scenarios, similarities of the driving scenarios, and so on. Additional details are described throughout this disclosure and are not repeated here.

In some examples, a cluster of scenarios can be sub-sampled to reduce the data volume. For example, a cluster of scenarios labeled as "interactions between an autonomous vehicle and an object at a junction" may include an enormous amount of data (e.g., 105 million data portions representing scenarios). The dataset pruner 310 can sub-sample the clustered scenarios to eliminate some repeating scenarios. In some examples, after sub-sampling, the data volume of the cluster of scenarios can be significantly reduced (e.g., from 105 million data portions to a few millions of data portions). The interval of sub-sampling can be configured arbitrarily or based on criteria.

In some instances, different pruning methods can be used individually or in combination for the dataset pruner 310 to prune the dataset. For example, the dataset pruner 310 can prune the dataset based on the threshold of the size of the dataset and can select driving scenarios with a ranking above 8 associated with the same label. As another example, the dataset pruner 310 can prune the dataset by discarding the driving scenarios with rankings lower than 3 and can sub-sample the driving scenarios with a ranking over 8 to make sure that the threshold of the size of the dataset is met.

At operation 322, example process 300 may comprise training a machine learned model with the dataset. In some examples, the dataset with clustered scenarios can be used for training, testing, and/or validating components that can be incorporated into the autonomous vehicle. In some circumstances, running a large amount of data (e.g., several millions of data samples/portions) to train test, and/or validate a machine-learned model can take a long time (e.g., several days or the like). By balancing and/or pruning the scenarios, the diversity of scene types in a dataset can be maintained. For example, a scenario that occurs rarely (e.g., with a chance of one in a million or the like) in the log data can be identified and added to the dataset. When training a component of the autonomous vehicle, the dataset with clustered scenarios can achieve the same or similar training results to running millions of data samples/portions. As such, the efficiency of training, testing, and/or validating components can be improved.

Figure 4:
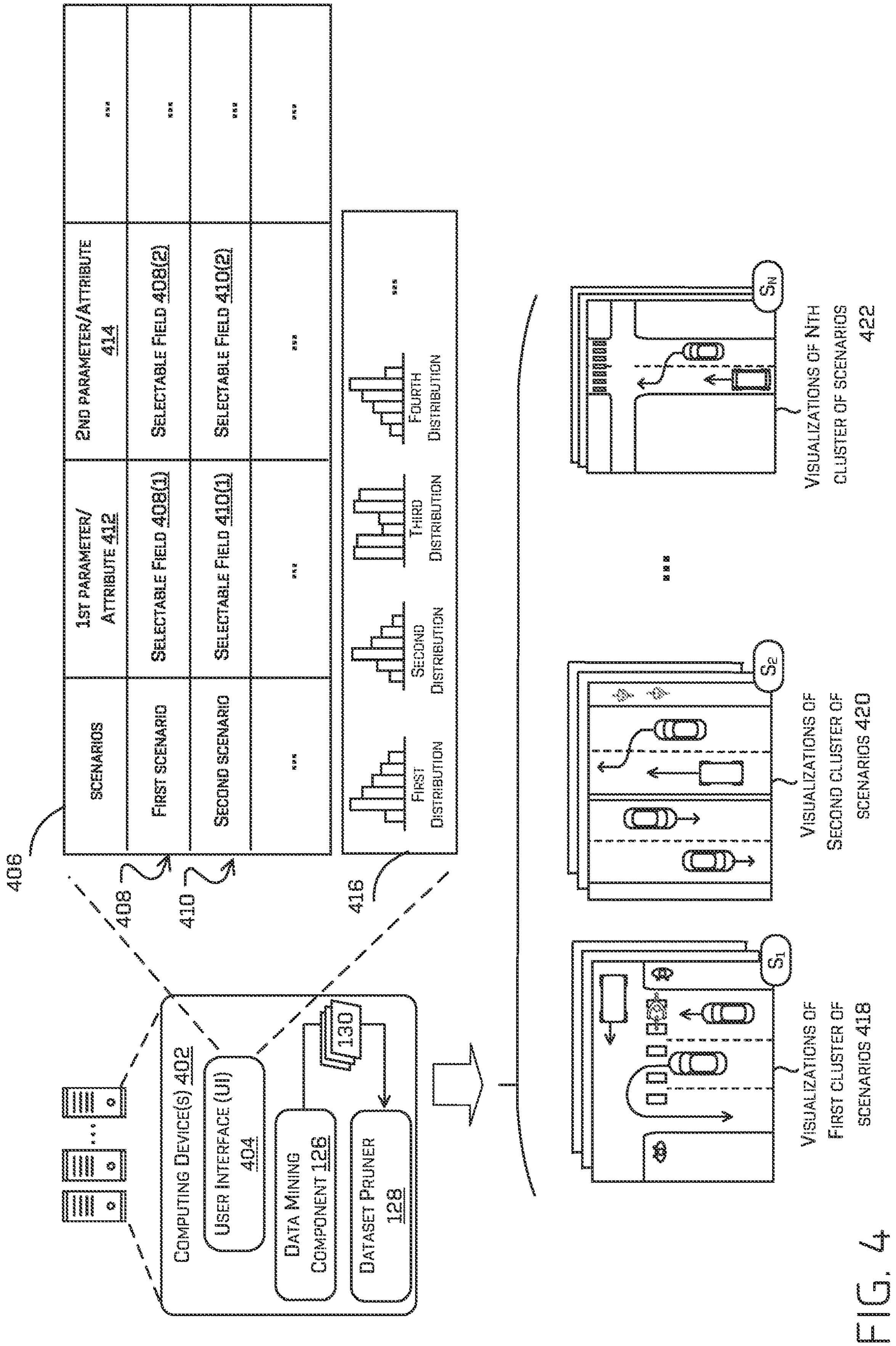
FIG. 4 illustrates an example computing device(s) including a user interface (UI) providing functionality to configure an instruction including definitions of scenarios.

FIG. 4 illustrates an example computing device(s) 402 including a user interface (UI) 404 providing functionality to configure an instruction including definitions of scenarios. In some examples, the example computing device(s) 402 can correspond to the computing device(s) 122 described with respect to FIG. 1.

The computing device(s) 402 can include a UI 404 configured to present a configurable tool 406. In some examples, a user (e.g., a software developer, a vehicle designer, an engineer, or the like) can use the configurable tool 406 to configure an instruction to generate a dataset with specification s of scenarios and/or a distribution of an attribute of scenarios. For example, the configurable tool 406 can define various driving sequences (e.g., a first scenario 408, a second scenario 410, and the like) based on one or more parameters/attributes (e.g., a first parameter/attribute 412, a second parameter/attribute 414, and the like). As an example, the first parameter/attribute 412 and the second parameter/attribute 414 can include a geographical area in which an autonomous vehicle is operating, a classification of the object (e.g., pedestrians, vehicles, cyclists, or the like), a maneuver of the object (e.g., changing lane, turning left, turning right, moving forward, parking, crossing the road, stopping, or the like), a maneuver of the autonomous vehicle (e.g., changing lane, turning left, turning right, moving forward, parking, or the like), a status associated with the object (e.g., a location of the object, a velocity of the object, a moving direction of the objection, a turning angle of the object, yaw, pitch, and roll rates, or the like), status associated with the autonomous vehicle (e.g., a location of the autonomous vehicle, a velocity of the autonomous vehicle, a moving direction of the autonomous vehicle, a turning angle of the autonomous vehicle, or the like), environmental attributes (e.g., road conditions on which the autonomous vehicle is traveling, weather conditions of the environment in which the autonomous vehicle is traveling, traffic conditions of the environment in which the autonomous vehicle is traveling, or the like), an interaction type, an order of interactions (e.g., the autonomous vehicle follows an object, and then the object turns left, and then the autonomous vehicle stops following the object, or the like), a time range (e.g., the day and time, or the like) associated with the scenario, or the like.

In some instances, for the first scenario 408, the UI can present selectable fields 408(1), 408(2), or the like. For example, the selectable fields 408(1), 408(2), or the like that can allow the first parameter/attribute and the second parameter/attribute associated with the first scenario 408 to be configured and/or selected from multiple options. In some instances, for the second scenario 410, the UI 404 can present selectable fields 410(1), 410(2), and the like that can allow the first parameter and the second parameter associated with the second scenario 410 to be configured and/or selected from multiple options. Additionally, more scenarios can be added and configured via the UI 404.

Additionally, the UI can allow the user to configure one or more distributions 416 (e.g., a first distribution, a second distribution, a third distribution, a fourth distribution, or the like) with regard to scenarios. For example, the user may want to train a model regarding interactions between an autonomous vehicle and an object at a junction. The user can construct an instruction via the UI 404 requiring a dataset with 10% scenarios in which a pedestrian is crossing the road when an autonomous vehicle is passing through a junction, 60% scenarios in which an object is making a U-turn when an autonomous vehicle is passing through a junction, and 30% scenarios where an object is turning left when an autonomous vehicle is passing through a junction. As another example, the user may want to test a model regarding how the autonomous operate when a pedestrian is crossing the road across various geographical areas. The user can construct an instruction via the UI 404 requiring a dataset with 20% scenarios in which a pedestrian is crossing the road when an autonomous vehicle is traveling in a geographical area of San Francisco, 30% scenarios in which a pedestrian is crossing the road in a geographical area of Las Vegas, and 50% scenarios in which a pedestrian is crossing the road in a geographical area of Los Angeles.

As described above, the mining component 126 can output labeled log data 130, where the parameters/attributes can be represented by labels that can be associated with portions of data in the log data representing events. The dataset pruner 128 can scan the labeled log data 130 to aggregate data portions representing events to form data portions representing scenarios based on scene definitions provided via the UI 404. The dataset pruner 128 can generate a dataset that meets the specification included in the instruction in terms of scenarios, distributions, or the like. Moreover, the dataset pruner 128 can prune the scenarios based on techniques described throughout this disclosure. In some instances, the dataset pruner 128 can output visualizations of scenarios (e.g., visualizations of the first cluster of scenarios 418, visualizations of the second cluster of scenarios 420, visualizations of the nth cluster of scenarios 422, and the like) based on portions of data representing the scenarios. Techniques of generating driving sequences based on log data are discussed in U.S. application Ser. No. 16/866,715, titled "System for Generating Generalized Simulation Scenarios," which is herein incorporated by reference in its entirety for all purposes. Examples of scenario simulation can be found, for example, in U.S. patent application Ser. No. 16/392,094 titled "Scenario Editor and Simulator" and filed Apr. 23, 2019, which is incorporated by reference in its entirety for all purposes.

Figure 5:
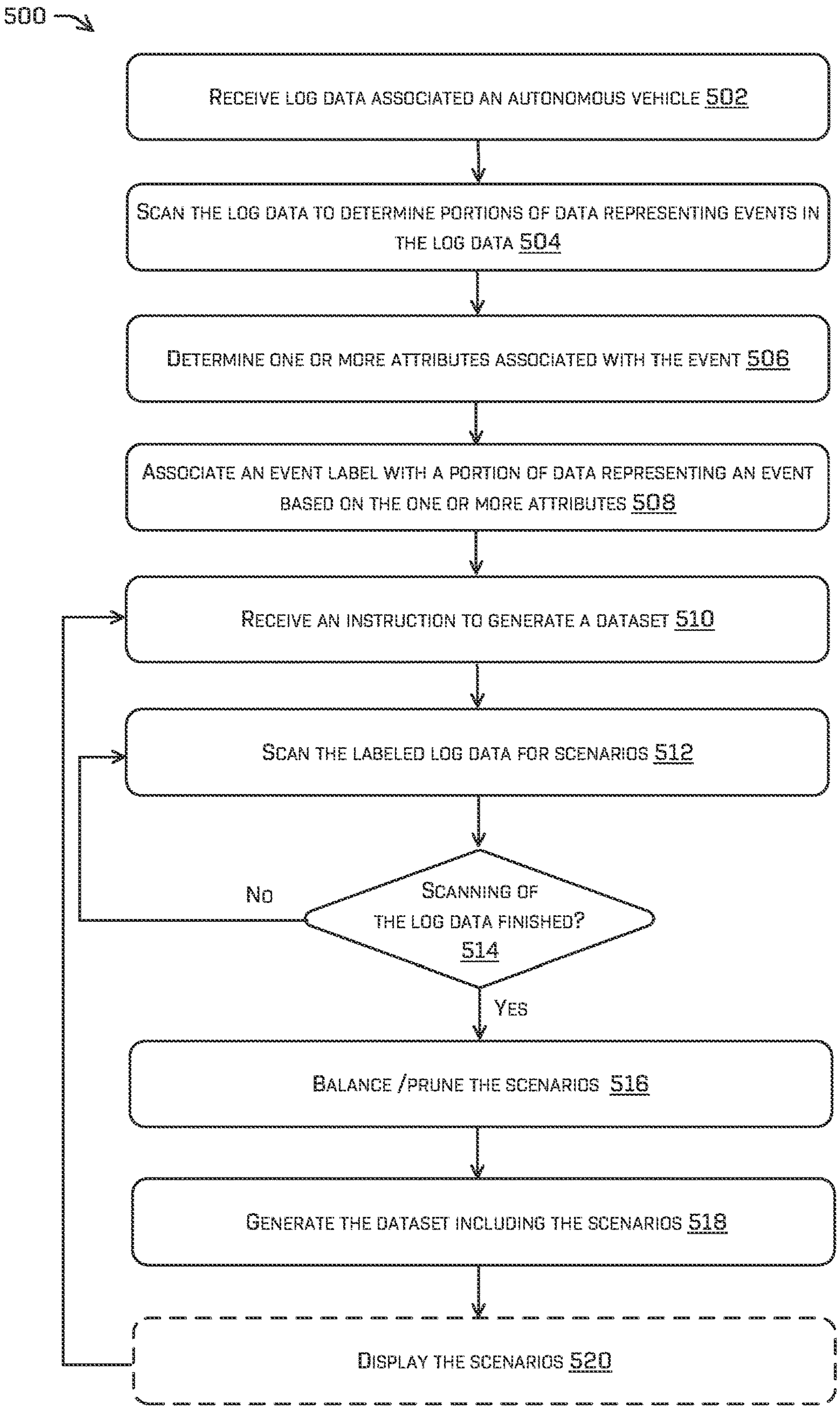
FIG. 5 illustrates a flow diagram of an example process for generating a balanced dataset with clustered scenarios.

FIG. 5 illustrates a flow diagram of an example process 500 for generating a dataset with clustered scenarios. In the example process 500, the order in which the operations are described should not be construed as a limitation. Any number of the described blocks can be combined in any order and/or in parallel to implement the processes, or alternative processes, and not all of the blocks need to be executed. For discussion purposes, the processes herein are described with reference to the frameworks, architectures, and environments described in the examples herein, although the process may be implemented in a wide variety of other frameworks, architectures, or environments.

At operation 502, example process 500 may comprise receiving log data associated with an autonomous vehicle. In some instances, the autonomous vehicle may be an autonomous vehicle configured to operate according to a Level 5 classification issued by the U.S. National Highway Traffic Safety Administration. For simplicity, the discussion herein does not distinguish between a simulated vehicle and a real-world vehicle. References to a "vehicle" may therefore reference a simulated and/or a real-world vehicle. In some examples, the log data 120 can include the sensor data, perception data, prediction data, planning data, vehicle status data, velocity data, intent data, and/or other data generated by the autonomous vehicle during operation including, but not limited to, control messages, error messages, etc. In some examples, the log data can include map data and location data indicating a region such as the environment and how the autonomous vehicle traversed through the region.

Additionally, the log data can include status data of the autonomous vehicle, including but not limited to acceleration data, steering angle data, indicator status data, etc. as the autonomous vehicle traversed through the region. The log data can include time data that associates the actions of the autonomous vehicle and observations (e.g., sensor data) with a set of timestamps.

At operation 504, example process 500 may comprise scanning the log data to determine portions of data representing events in the log data. Examples of an event can include, but are not limited to, an object braking associated with a deceleration above a threshold value, pedestrians crossing a crosswalk, an autonomous vehicle navigating around double-parked vehicles, an object making a U-turn, or the like. An event can be defined based on attributes such as an environmental layout, a type, statues, maneuver, and position of the object(s) in the environment, or the like. The data mining component may identify one or more portions of log data representing the event based on the definition. For example, the data mining component can determine a portion of data representing an event of an object making a U-turn based on the definition of U-turn.

At operation 506, example process 500 may comprise determining one or more attributes associated with the event. In some examples, the data mining component can determine attributes/parameters associated with events, such as a classification of the object, a maneuver of the object, a maneuver of the autonomous vehicle, a status associated with the object, the status associated with the autonomous vehicle, environmental attributes, timestamps, or the like.

At operation 508, example process 500 may comprise associating an event label with a portion of data representing an event based on the one or more attributes. For example, the data mining component can determine that a portion of data representing an event of the U-turn maneuver of an object, and can associate a label "object making a U-turn" with the portion of data representing the event. In some examples, the labels can be metadata associated with the data portion representing the event. The data mining component can output labeled log data with portions of data representing various events.

At operation 510, example process 500 may comprise receiving an instruction to generate a dataset. In some examples, the dataset can be used for training, testing, and/or validating a component of an autonomous vehicle, such as the perception component, the prediction component, or the like. Additionally, the dataset can be used by a simulation system that can run simulations of the driving environment. In some examples, the instruction 132 can include a specification of scenarios with various attributes. For example, the instruction 132 can require scenarios with an object making a U-turn while an autonomous vehicle is at a junction. In some examples, the instruction 132 can include a specification related to the distribution of the scenarios. For example, the instruction 132 can require a dataset with 10% scenarios in which a pedestrian is crossing the road when an autonomous vehicle is passing through a junction, 60% scenarios in which an object is making a U-turn when an autonomous vehicle is passing through a junction, and 30% scenarios where an object is turning left when an autonomous vehicle is passing through a junction. In some examples, the instruction 132 can be configured by a user (e.g., a software developer, a vehicle designer, an engineer, or the like), a computing device, a piece of code, or the like.

At operation 512, example process 500 may comprise scanning the labeled log data for scenarios. In some examples, a dataset pruner may determine whether a portion of data satisfies the definition of the scenario. In some examples, definitions of scenarios can be configured via a UI presented by a computing device (e.g., the computing device (s) 122 in FIG. 1, the computing device(s) 402 in FIG. 4, or the like.). In some examples, a dataset pruner can determine whether a portion of data represents a scenario based on the definition of the scenario. For example, to search for a scenario in which an object merges into a lane where an autonomous vehicle is traveling, a dataset pruner can search/scan the labeled log data for events labeled as "object merging into a lane" and "autonomous vehicle traveling in the lane," where such events can overlap fully or partially in time (e.g., within a threshold time period such as 5 seconds, 10 seconds, or the like) and proximate in space (e.g., within a threshold range of distance such as 0.5 miles, 1 mile, or the like). For example, the dataset pruner can determine that a portion of data including an event "an object merging into a lane" and an event "an autonomous vehicle is traveling in the lane" satisfies the definition of a scenario "object merging into a lane where an autonomous vehicle is traveling." Then, the dataset pruner can associate a label "object merging into a lane where an autonomous vehicle is traveling" with the portion of data representing the scenario. The dataset pruner can put up together all the scenes determined as "object merging into a lane where an autonomous vehicle is traveling" into the dataset.

As such, the same and/or similar scenarios can be clustered by adding labels to data portions representing the same and/or similar scenarios. For example, a scenario in which an autonomous vehicle passes through a junction interacting with a big truck turning left, a scenario in which an autonomous vehicle turns left at a junction while a pedestrian is crossing the crosswalk, and a scenario in which an autonomous vehicle passing through a junction while a cyclist is passing through the junction are similar in that they both include an interaction between an autonomous vehicle with an object at a junction. Hence, both scenarios can be labeled as "autonomous vehicles interacting with objects at a junction." Moreover, all the scenarios in the log data that include an interaction between an autonomous vehicle with an object at a junction can be labeled as "autonomous vehicle interacting with objects at a junction." Similarly, scenarios that include an object making a U-turn can be labeled as "object making a U-turn," and scenarios that include an object changing lane with an autonomous vehicle passing through can be labeled as "object changing lane with an autonomous vehicle passing through," etc. The labels associated with the scenarios can also be referred to as scene types. As such, the scenarios are clustered based on types/labels, which makes it convenient to search for a particular type of scenario and to construct a dataset. A label may include a specific interaction such as contact between two objects or object types, a specific maneuver caused by a vehicle, a time of day associated with a portion of log data, or a location of the log data or a location type (e.g., at a school or 3-way road intersection).

At operation 514, example process 500 may comprise determining whether the canning of the log data is finished. In some examples, example process 500 may continue to iteratively execute operations 512 and 514 until all the log data are searched. Once the scanning of the log data is finished, example process 500 may continue to operation 516.

At operation 516, example process 500 may comprise balancing/pruning the scenarios. For example, the dataset pruner can balance the scenarios by configuring a distribution of the scenarios based on at least one attribute of the scenario. In some examples, the distribution of the scenarios can be based on the geographical areas in which an autonomous vehicle is operating. For example, a dataset pruner can balance a cluster of scenarios to include 20% scenarios in which a pedestrian is crossing the road while an autonomous vehicle is traveling in a geographical area of San Francisco, 30% scenarios in which a pedestrian is crossing the road while an autonomous vehicle is traveling in a geographical area of Las Vegas, and 50% scenarios in which a pedestrian is crossing the road while an autonomous vehicle is traveling in a geographical area of Los Angeles.

In some examples, the distribution 320 of the scenarios can be based on an integration type of an autonomous vehicle and an object. For example, a dataset pruner can balance a cluster of scenarios to include 20% scenarios in which a pedestrian is crossing the road when an autonomous vehicle is moving along the road, 30% scenarios in which an object is making a U-turn while an autonomous vehicle is at a junction, and 50% scenarios where an object is merging into a lane in which an autonomous vehicle is traveling.

In some examples, the balancing/pruning of the dataset can be based on the rareness scores of the driving scenarios. For example, a driving scenario can be associated with a rareness score that indicates the rareness of the driving scenario. For example, a rareness score of 1 can indicate that the driving scenario occurs relatively often. As another example, a rareness score of 8 can indicate that the driving scenario occurs relatively rarely. In some examples, the balancing/pruning of the dataset can be based on rankings of the driving scenarios that indicate the difficulty of the driving scenario. The difficulty of the driving scenario can refer to how hard for a component to handle the driving scenario. For example, a driving scene with multiple objects closely around an autonomous vehicle can be hard for the autonomous vehicle to handle, while a driving scene with one object far away from the autonomous vehicle can be easy for the autonomous vehicle to handle. As another example, in a driving scene where the road has many turns, predictions can be hard for a prediction component. As another example, a ranking of 8 can indicate that the driving scenario is relatively difficult.

In an example instance, the dataset pruner can prune the dataset by selecting driving scenarios with designated rareness scores and/or rankings (e.g., below 3, above 4, between 5 and 7, or the like). Through the pruning methods discussed here, the data volume of the dataset can be significantly reduced with a balanced of driving scenarios. Because data portions representing driving scenarios with diversity can be selected by designating the rankings of the driving scenarios. Moreover, the training efficiency of machined learned model using such a dataset can be improved. Because the training does not require the machined learned model to go through an enormous amount (e.g., 500 PB) of data to learn how to deal with different driving scenarios. Instead, the machined learned model can be trained with a relatively smaller amount of data (e.g., a few PB) to learn how to deal with various driving scenarios. The training time can be reduced, and the computing resources can be saved.

In some examples, a cluster of scenarios can be subsampled to reduce the data volume. Subsampling refers to a method that reduces data size by selecting a subset of the original data. For example, a cluster of scenarios labeled as "interactions between an autonomous vehicle and an object at a junction" may include an enormous amount of data (e.g., 105 million data portions representing scenarios). The data generator can sub-sample the clustered scenarios to eliminate some repeating scenarios. In some examples, after sub-sampling, the data volume of the cluster of scenarios can be significantly reduced (e.g., from 105 million data portions to a few million of data portions). The interval of subsampling can be configured arbitrarily or based on criteria.

In some examples, the dataset pruner can prune the dataset by controlling the size of the dataset to meet a threshold (e.g., 100 PB, 10 PB, or the like). Moreover, there can be a threshold for an individual cluster of scenarios (e.g., 5 GB, 1 GB, or the like). For example, the dataset pruner can randomly select 50 PB data out of 100 PB data representing scenarios associated with the same label of "object changing lane with an autonomous vehicle passing through." In some instances, different pruning methods can be used individually or in combination for the dataset pruner to prune the dataset.

At operation 518, example process 500 may comprise generating the dataset including the scenarios. In some examples, after searching the labeled log data for scenarios and balancing the scenarios, the dataset pruner can put up together a dataset based on the specification of the instruction received in operation 510. For example, if the instruction includes specifications for particular types of scenarios, the dataset pruner can generate the dataset to include the particular types of scenarios. If the instruction includes specifications for a distribution of scenarios, the dataset pruner can generate the dataset to have the distribution of scenarios. The dataset can be used as input to train, test, and/or validate components (e.g., a perception component, a prediction component, or the like) of autonomous vehicles.

At operation 520, example process 500 may comprise optionally displaying the scenarios. In some examples, the dataset pruner can output visualizations of scenarios based on portions of data representing the scenarios. Techniques of generating driving sequences based on log data are discussed in U.S. application Ser. No. 16/866,715, titled "System for Generating Generalized Simulation Scenarios," which is herein incorporated by reference in its entirety for all purposes.

In some examples, example process 500 may continue to iteratively execute operations 510 to 520 to update the instruction for generating datasets for various purposes (e.g., training, testing, and/or validating components of autonomous vehicles). For example, a user can update or construct a new instruction requiring different types of scenarios, and/or scenarios with different distributions. In some examples, the dataset pruner does not need to regenerate the entire dataset, and efficiency can be improved.

Figure 6:
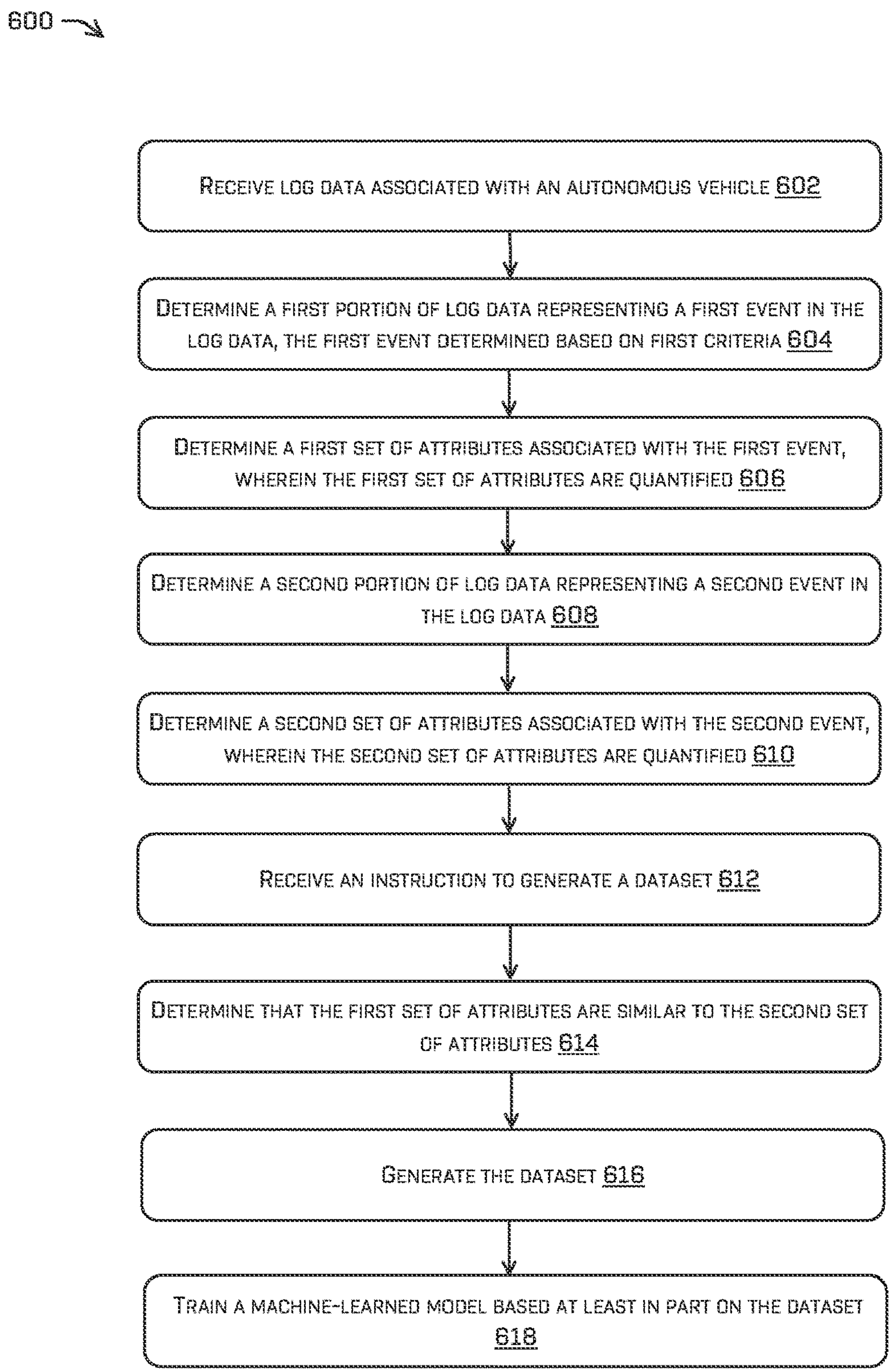
FIG. 6 illustrates a flow diagram of another example process for generating a balanced dataset with clustered scenarios.

FIG. 6 illustrates a flow diagram of another example process 600 for generating a balanced dataset with clustered scenarios. In the example process 600, the order in which the operations are described should not be construed as a limitation. Any number of the described blocks can be combined in any order and/or in parallel to implement the processes, or alternative processes, and not all of the blocks need to be executed. For discussion purposes, the processes herein are described with reference to the frameworks, architectures, and environments described in the examples herein, although the process may be implemented in a wide variety of other frameworks, architectures, or environments.

At operation 602, example process 600 may comprise receiving log data associated with an autonomous vehicle. In some examples, the log data can include the sensor data, perception data, prediction data, planning data, vehicle status data, velocity data, intent data, and/or other data generated by the autonomous vehicle. In some instances, the log data can include metadata that is associated with the other data generated by the autonomous vehicle.

At operation 604, example process 600 may comprise determining a first portion of log data representing a first event in the log data. The first event can be determined based on first criteria.

At operation 606, example process 600 may comprise determining a first set of attributes associated with the first event, wherein the first set of attributes are quantified. In some examples, a first label can be determined for the first portion of log data based at least in part on the first set of attributes. In some examples, the first set of attributes may include a classification of an object, a location of the object, a status of the object, a location of the autonomous vehicle, a status of the autonomous vehicle, a geographical area, an interaction of the object and the autonomous vehicle, a timestamp associated with the event, or the like.

At operation 608, example process 500 may comprise determining a second portion of log data representing a second event in the log data. In some examples, the second event can be determined based on second criteria that are different from the first criteria.

At operation 610, example process 600 may comprise determining a second set of attributes associated with the second event. In some examples, the second set of attributes are quantified/parameterized. In some examples, the second set of attributes may include a classification of an object, a location of the object, a status of the object, a location of the autonomous vehicle, a status of the autonomous vehicle, a geographical area, an interaction of the object and the autonomous vehicle, a timestamp associated with the event, or the like. In some examples, a second label can be determined for the second portion of log data based at least in part on the second set of attributes.

At operation 612, example process 600 may comprise receiving an instruction to generate a dataset. In some examples, the instruction can include a specification of scenarios with various attributes. In some examples, the instruction can require scenarios with an object making a U-turn while an autonomous vehicle is at a junction. In some examples, the instruction can include a attributes/parameters related to the first event and/or the second event.

At operation 614, example process 600 may comprise determining that the first set of attributes are similar to the second set of attributes. In some examples, the first set of attributes and the second set of attributes can be clustered. A distance between a first cluster associated with the first set of attributes and a second cluster associated with the second set of attributes can be determined within a threshold. The threshold is determined based at least in part on a target size for the dataset. In some examples, a similarity between the first portion of the log data and the second portion of the log data can be determined based at least in part on the first label and the second label.

At operation 616, example process 600 may comprise generating the dataset. In some examples, the dataset can include only one of the first portion of the log data or the second portion of the log data based at least in part on the determining that the first set of attributes are similar to the second set of attributes. In some examples, the dataset can be generated based at least in part on the determining the similarity between the first portion of the log data and the second portion of the log data based at least in part on the first label and the second label.

At operation 618, example process 600 may comprise training a machine-learned model based at least in part on the dataset. In some examples, the dataset can be used for training, testing, and/or validating a component of an autonomous vehicle, such as the perception component, the prediction component, or the like.

Figure 7:
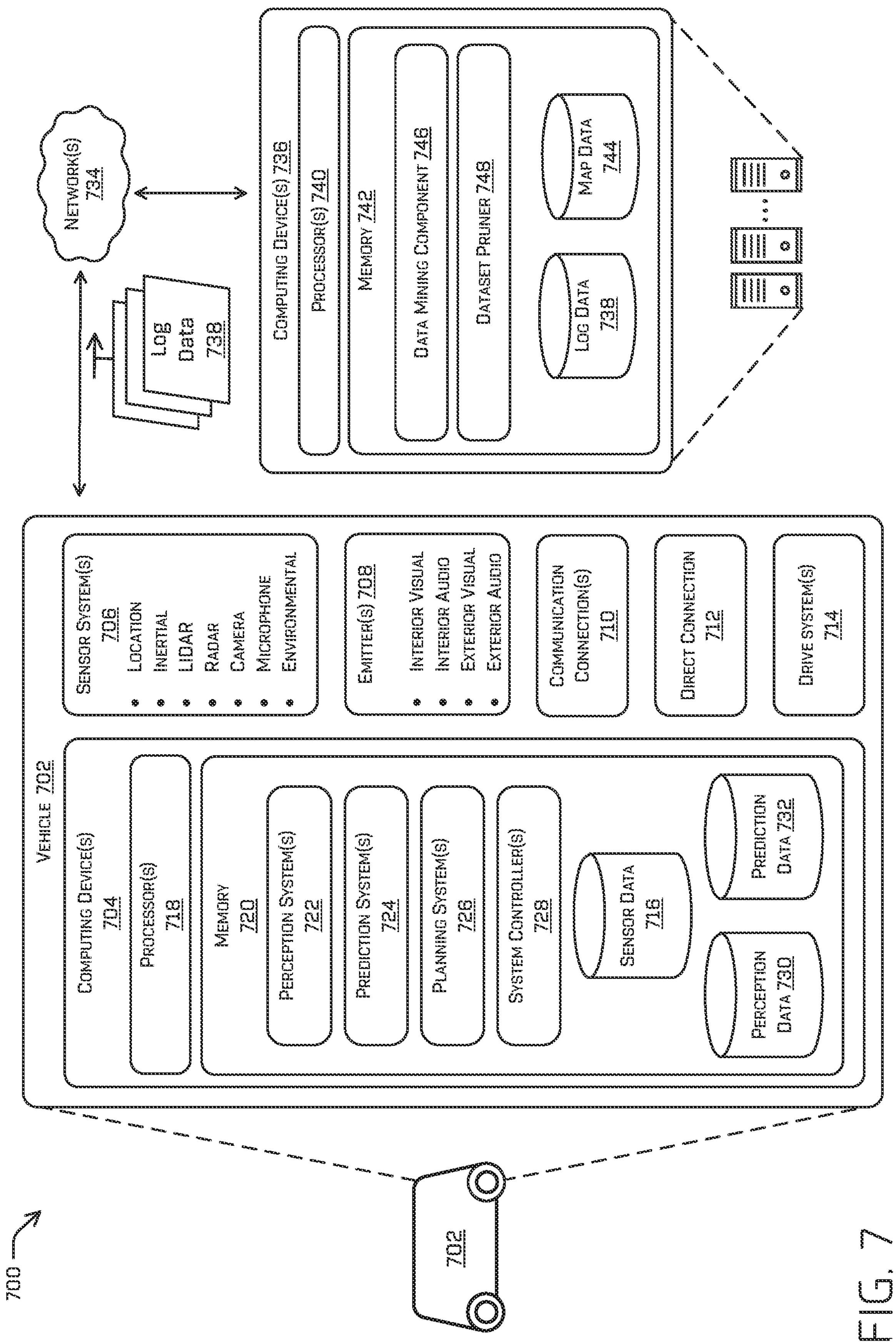
FIG. 7 depicts a block diagram of an example system for implementing the techniques discussed herein.

FIG. 7 depicts a block diagram of an example system 700 for implementing the techniques discussed herein. In at least one example, the system 700 may include a vehicle 702, such as the autonomous vehicles discussed above. The vehicle 702 may include computing device(s) 704, one or more sensor system(s) 706, one or more emitter(s) 708, one or more communication connection(s) 710 (also referred to as communication device(s) and/or modems), at least one direct connection 712 (e.g., for physically coupling with the vehicle 702 to exchange data and/or to provide power), and one or more drive system(s) 714. The one or more sensor system(s) 706 may be configured to capture the sensor data 716 associated with a surrounding physical environment.

In at least some examples, the sensor system(s) 706 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 706 may include multiple instances of each type of sensor. For instance, time-of-flight sensors may include individual time-of-flight sensors located at the corners, front, back, sides, and/or top of the vehicle 702. As another example, camera sensors may include multiple cameras disposed of at various locations about the exterior and/or interior of the vehicle 702. In some cases, the sensor system(s) 706 may provide input to the computing device(s) 704.

The vehicle 702 may also include one or more emitter(s) 708 for emitting light and/or sound. The one or more emitter(s) 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 708 in this example also include exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 702 can also include one or more communication connection(s) 710 that enable communication between the vehicle 702 and one or more other local or remote computing device(s) (e.g., a remote teleoperations computing device) or remote services. For instance, the communication connection(s) 710 can facilitate communication with other local computing device(s) on the vehicle 702 and/or the drive system(s) 714. Also, the communication connection(s) 710 may allow the vehicle 702 to communicate with other nearby computing device(s) (e.g., other nearby vehicles, traffic signals, etc.).

The communications connection(s) 710 may include physical and/or logical interfaces for connecting the computing device(s) 704 to another computing device or one or more external network(s) 734 (e.g., the Internet). For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 710 may comprise the one or more modems as described in detail above.

In at least one example, the vehicle 702 may include one or more drive system(s) 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 can include one or more sensor system(s) 706 to detect conditions of the drive system(s) 714 and/or the surroundings of the vehicle 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 714. In some cases, the sensor system(s) 706 on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate the loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which may receive and preprocess data from the sensor system(s) 706 and to control operation of the various vehicle systems. In some examples, the drive system controller can include one or more processor(s) and memory communicatively coupled with the one or more processor(s). The memory can store one or more modules to perform various functionalities of the drive system(s) 714. Furthermore, the drive system(s) 714 also includes one or more communication connection(s) that enable communication by the respective drive system with one or more other local or remote computing device(s).

The computing device(s) 704 may include one or more processors 718 and one or more memories 720 communicatively coupled with the processor(s) 718. In the illustrated example, the memory 720 of the computing device(s) 704 stores perception systems(s) 722, prediction systems(s) 724, planning systems(s) 726, as well as one or more system controller(s) 728. The memory 720 may also store data such as sensor data 716 captured or collected by the one or more sensors systems 706, perception data 730 associated with the processed (e.g., classified and segmented) sensor data 716, prediction data 732 associated with one or more predicted state of the environment and/or detected objects within the environment. Though depicted as residing in the memory 720 for illustrative purposes, it is contemplated that the perception systems(s) 722, prediction systems(s) 724, planning systems(s) 726, as well as one or more system controller(s) 728, may additionally, or alternatively, be accessible to the computing device(s) 704 (e.g., stored in a different component of vehicle 702 and/or be accessible to the vehicle 702 (e.g., stored remotely).

The perception system 722 may be configured to perform object detection, segmentation, and/or classification on the sensor data 716. In some examples, the perception system 722 may generate processed perception data 730 from the sensor data 716. The perception data 730 may indicate a presence of objects that are in physical proximity to the vehicle 702 and/or a classification or type of the objects (e.g., car, pedestrian, cyclist, building, tree, road surface, curb, sidewalk, unknown, etc.). In additional and/or alternative examples, the perception system 722 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the environment may include, but are not limited to, a presence of another object, a time of day, a weather condition, a geographical area position, an indication of darkness/light, etc. For example, details of classification and/or segmentation associated with a perception system are discussed in U.S. application Ser. No. 15/820,245, which are herein incorporated by reference in their entirety for all purposes.

The prediction system 724 may be configured to determine a track corresponding to an object identified by the perception system 722. For example, the prediction system 724 may be configured to predict a velocity, position, change in trajectory, or otherwise predict the decisions and movement of the identified objects. For example, the prediction system 724 may include one or more machine learned models that may, based on inputs such as object type or classification and object characteristics, output predicted characteristics of the object at one or more future points in time. For example, details of prediction systems are discussed in U.S. application Ser. Nos. 16/246,208 and 16/420,050, which are herein incorporated by reference in their entirety.

The planning system 726 may be configured to determine a route for the vehicle 702 to follow to traverse through an environment. For example, the planning system 726 may determine various routes and paths and various levels of detail based at least in part on the objects detected, the predicted characteristics of the object at future times, and a set of safety specifications corresponding to the current driving sequence (e.g., combination of objects detected and/or environmental conditions). In some instances, the planning system 726 may determine a route to travel from a first location (e.g., a current location) to a second location (e.g., a target location) in order to avoid an object obstructing or blocking a planned path of the vehicle 702. In some cases, a route can be a sequence of waypoints for traveling between the two locations (e.g., the first location and the second location). In some cases, waypoints include streets, intersections, global positioning system (GPS) coordinates, etc. For example, details of path and route planning by the planning system are discussed in U.S. application Ser. Nos. 16/805,118 and 15/732,208, which are herein incorporated by reference, in their entirety.

In at least one example, the computing device(s) 704 may store one or more and/or system controllers 728, which may be configured to control steering, propulsion, braking, safety, emitters, communication, and other systems of the vehicle 702. The system controllers 728 may communicate with and/or control corresponding systems of the drive system(s) 714 and/or other components of the vehicle 702, which may be configured to operate in accordance with a route provided by the planning system 726.

In some implementations, the vehicle 702 may connect to computing device(s) 736 via the network(s) 734. For example, the computing device(s) 736 may receive log data 738 from one or more vehicles 702. The log data 738 may include the sensor data, perception data 730, prediction data 732, and/or a combination thereof. In some cases, the log data 738 may include a sequence of one or more of the sensor data, perception data 730, and prediction data 732.

The computing device(s) 736 may include one or more processors 740 and memory 742 communicatively coupled with the one or more processors 740. In at least one instance, the processor(s) 740 may be similar to the processor(s) 718 and the memory 742 may be similar to the memory 720. In the illustrated example, the memory 742 of the computing device(s) 736 stores the log data 738 received from one or more vehicles 702. The memory 742 may also store map data 744 associated with objects and/or the vehicle 702 represented in the log data 738. The memory 742 may also store a data mining component 746 and a dataset pruner 748. The 74data mining component 746 and the dataset pruner 748 can respectively correspond to the data mining component 126 and the dataset pruner 128 as described with respect to FIG. 1.

The 74data mining component 746 can search/scan the log data 120 to determine one or more events (e.g., braking associated with a deceleration above a threshold value, pedestrians crossing a crosswalk, navigating around double-parked vehicles, object making a U-turn, and the like). The 74data mining component 746 may determine a set of attributes/parameters to represent the characteristics of an event. The 74data mining component 746 can associate one or more labels with the data portion representing an event based on the attributes of the event. In some examples, the labels can be metadata associated with the data portion representing the event. The 74data mining component 746 can output labeled log data for further processing.

The dataset pruner 748 can search/scan the labeled log data to determine portions of data representing scenarios. In some examples, the dataset pruner 748 can aggregate data portions representing events to be a data portion representing a scenario. The dataset pruner 748 can associate the data portion representing a scenario with one or more labels based on the attributes. In some examples, the labels can be metadata associated with the data portion representing the scenario. In some examples, the dataset pruner 748 can balance/prune the dataset using techniques described throughout this disclosure.

The processor(s) 718 of the computing device(s) 704 and the processor(s) 740 of the computing device(s) 736 may be any suitable processor capable of executing instructions to process data and perform operations as described herein. By way of example and not limitation, the processor(s) 718 and 740 can comprise one or more Central Processing Units (CPUs), Graphics Processing Units (GPUs), or any other device or sequence of a device that processes electronic data to transform that electronic data into other electronic data that can be stored in registers and/or memory. In some examples, integrated circuits (e.g., ASICs, etc.), gate arrays (e.g., FPGAs, etc.), and other hardware device(s) can also be considered processors in so far as they are configured to implement encoded instructions.

The memory 720 of the computing device(s) 704 and the memory 742 of the computing device(s) 736 are examples of non-transitory computer-readable media. The memory 720 and 742 can store an operating system and one or more software applications, instructions, programs, and/or data to implement the methods described herein and the functions attributed to the various systems. In various implementations, the memory 720 and 742 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 720 and 742, such as the perception system(s) 722, prediction system(s) 724, planning system(s) 726, data mining component 746, dataset pruner 748, and/or the machine-learned model trained according to the techniques discussed herein can include machine-learned model(s) implemented as a neural network. Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/973,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

EXAMPLE CLAUSES

A: A system, comprising: one or more processors; and non-transitory memory storing processor-executable instructions that, when executed by the one or more processors, cause the system to perform operations comprising: receiving log data associated with an autonomous vehicle; determining a first portion of log data representing a first event in the log data, the first event determined based on first criteria; determining a first set of attributes associated with the first event, wherein the first set of attributes are quantified; determining a second portion of log data representing a second event in the log data, the second event determined based on second criteria different from the first criteria; determining a second set of attributes associated with the second event, wherein the second set of attributes are quantified; receiving an instruction to generate a dataset; determining that the first set of attributes are similar to the second set of attributes; generating the dataset, wherein the dataset includes only one of the first portion of the log data or the second portion of the log data based at least in part on the determining that the first set of attributes are similar to the second set of attributes; and training a machine-learned model based at least in part on the dataset.

B: The system of paragraph A, wherein the determining that the first set of attributes are similar to the second set of attributes includes clustering the first set of attributes and the second set of attributes; and determining that a distance between a first cluster associated with the first set of attributes and a second cluster associated with the second set of attributes is within a threshold.

C: The system of paragraph B, wherein the threshold is determined based at least in part on a target size for the dataset.

D: The system of any of paragraphs A-C, wherein the first set of attributes comprise at least one of: a classification of an object; a location of the object; a status of the object; a location of the autonomous vehicle; a status of the autonomous vehicle; a geographical area; an interaction of the object and the autonomous vehicle; or a timestamp associated with the event.

E: The system of any of paragraphs A-D, further comprising: determining a first label for the first portion of log data based at least in part on the first set of attributes; determining a second label for the second portion of log data based at least in part on the second set of attributes; and determining a similarity between the first portion of the log data and the second portion of the log data based at least in part on the first label and the second label; wherein the generating the dataset is based at least in part on the determining the similarity between the first portion of the log data and the second portion of the log data based at least in part on the first label and the second label.

F: A method comprising: determining first log data associated with a first vehicle based on first criteria; determining second log data based on second criteria different from the first criteria; receiving an instruction to generate a dataset; parameterizing the first log data and the second log data; determining a similarity between the first log data and the second log data based at least in part on the parameterizing the first log data and the second log data; and determining, based at least in part on the similarity between the first log data and the second log data, to exclude at least one of the first log data or the second log data from a dataset associated with a second vehicle.

G: The method of paragraph F, further comprising: training or validating a machine-learned model associated with the second vehicle based at least in part on the dataset.

H: The method of paragraph G, wherein the machine-learned model is a prediction component of the second vehicle and the first log data and the second log data are associated with driving scenarios.

I: The method of paragraph H, wherein the first criteria include at least one of: an object maneuver; an object interaction type; an object type; a road intersection type; a location; or a time of day.

J: The method of any of paragraphs F-I, wherein the parameterizing is of one or more attributes of the first log data or the second log data comprising at least one of: a classification of an object; a location of the object; a status of the object; a location of the vehicle; a status of the vehicle; an interaction of the object and the vehicle; or a timestamp associated with a scenario.

K: The method of any of paragraphs F-J, wherein the parameterization includes at least one of: a threshold of a size of the dataset, a rareness score associated with the first log or second log data, or a difficulty ranking associated with the first log or the second log data.

L: The method of any of paragraphs F-K, wherein determining to exclude at least one of the first log data or the second log data from the dataset comprises: sub-sampling at least one the first log data or the second log data based at least in part determining the similarity.

M: The method of any of paragraphs F-L, wherein first log data and the second log data are sampled based on a respective label for the first log data and the second log data.

N: The method of any of paragraphs F-M, wherein the determining the similarity between the first log data and the second log data includes clustering parameters associated with the first log data and the second log data and determining a distance between a first cluster associated with the first log data and a second cluster associated with the second log data.

O: A non-transitory computer-readable medium storing processor-executable instructions that, when executed by one or more processors, cause the one or more processors to perform operations comprising: determining first log data associated with a first vehicle based on first criteria; determining second log data based on second criteria different from the first criteria; receiving an instruction to generate a dataset; parameterizing the first log data and the second log data; determining a similarity between the first log data and the second log data based at least in part on the parameterizing the first log data and the second log data; and determining, based at least in part on the similarity between the first log data and the second log data, to exclude at least one of the first log data or the second log data from a dataset associated with a second vehicle.

P: The non-transitory computer-readable medium of paragraph O, the operations further comprising: training or validating a machine-learned model associated with the second vehicle based at least in part on the dataset.

Q: The non-transitory computer-readable medium of any of paragraphs O-P, wherein the machine-learned model is a prediction component of the second vehicle and the first log data and second log data are associated with driving scenarios.

R: The non-transitory computer-readable medium of paragraph Q, wherein the first criteria include at least one of: an object maneuver; an object interaction type; an object type; a road intersection type; a location; or a time of day.

S: The non-transitory computer-readable medium of any of paragraphs O-R, wherein the parameterizing is of one or more attributes of the first log data or the second log data comprising at least one of: a classification of an object; a location of the object; a status of the object;

a location of the vehicle; a status of the vehicle; an interaction of the object and the vehicle; or a timestamp associated with a scenario.

T: The non-transitory computer-readable medium of any of paragraphs O-S, wherein the parameterization includes at least one of: a threshold of a size of the dataset, a rareness score associated with the first log or second log data, or a difficulty ranking associated with the first log or the second log data.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially the same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system, comprising:

one or more processors; and non-transitory memory storing processor-executable instructions that, when executed by the one or more processors, cause the system to perform operations comprising:

receiving log data associated with an autonomous vehicle;

determining a first portion of the log data representing a first event in the log data, the first event determined based on first criteria;

determining a first set of attributes associated with the first event, wherein the first set of attributes are quantified;

determining a second portion of the log data representing a second event in the log data, the second event determined based on second criteria different from the first criteria;

determining a second set of attributes associated with the second event, wherein the second set of attributes are quantified;

receiving an instruction to generate a dataset based at least in part on the log data, the instruction comprising a target distribution specifying proportions of scenarios having respective attributes associated with the dataset;

determining that the first set of attributes are similar to the second set of attributes;

generating the dataset based on the instruction to generate the dataset, wherein the dataset includes only one of the first portion of log data or the second portion of log data based at least in part on the determining that the first set of attributes are similar to the second set of attributes; and training a machine-learned model based at least in part on the dataset.

2. The system of claim 1, wherein the determining that the first set of attributes are similar to the second set of attributes includes clustering the first set of attributes and the second set of attributes; and determining that a distance between a first cluster associated with the first set of attributes and a second cluster associated with the second set of attributes is within a threshold.

3. The system of claim 2, wherein the threshold is determined based at least in part on a target size for the dataset.

4. The system of claim 1, wherein the first set of attributes comprises at least one of:

a classification of an object;
a location of the object;
a status of the object;
a location of the autonomous vehicle;
a status of the autonomous vehicle;
a geographical area;
an interaction of the object and the autonomous vehicle; or
a timestamp associated with the first event or the second event.

5. The system of claim 1, the operations further comprising:

determining a first label for the first portion of log data based at least in part on the first set of attributes; and
determining a second label for the second portion of log data based at least in part on the second set of attributes;
wherein the determining that the first set of attributes are similar to the second set of attributes is based at least in part on the first label and the second label.

6. A method comprising:

determining first log data associated with a first vehicle based on first criteria;
determining second log data based on second criteria different from the first criteria;
receiving an instruction to generate a dataset associated with a second vehicle, the instruction specifying proportions of scenarios having respective attributes associated with the dataset;
parameterizing the first log data and the second log data;
determining a similarity between the first log data and the second log data based at least in part on the parameterizing the first log data and the second log data; and
determining, based at least in part on the similarity between the first log data and the second log data, to exclude at least one of the first log data or the second log data from the dataset.

7. The method of claim 6, further comprising:

training or validating a machine-learned model associated with the second vehicle based at least in part on the dataset.

8. The method of claim 7, wherein the machine-learned model is a prediction component of the second vehicle and the first log data and the second log data are associated with driving scenarios.

9. The method of claim 8, wherein the first criteria include at least one of:

an object maneuver;
an object interaction type;
an object type;
a road intersection type;
a location; or
a time of day.

10. The method of claim 6, wherein the parameterizing is of one or more attributes of the first log data or the second log data comprising at least one of:

a classification of an object;
a location of the object;
a status of the object;
a location of the second vehicle;
a status of the second vehicle;
an interaction of the object and the second vehicle; or
a timestamp associated with a scenario.

11. The method of claim 6, wherein the parameterizing includes at least one of: a threshold of a size of the dataset, a rareness score associated with the first log data or the second log data, or a difficulty ranking associated with the first log data or the second log data.

12. The method of claim 6, wherein determining to exclude at least one of the first log data or the second log data from the dataset comprises:

sub-sampling at least one the first log data or the second log data based at least in part on determining the similarity.

13. The method of claim 6, wherein the first log data and the second log data are sampled based on respective labels for the first log data and the second log data.

14. The method of claim 6, wherein the determining the similarity between the first log data and the second log data includes clustering parameters associated with the first log data and the second log data and determining a distance between a first cluster associated with the first log data and a second cluster associated with the second log data.

15. A non-transitory computer-readable medium storing processor-executable instructions that, when executed by one or more processors, cause the one or more processors to perform operations comprising:

determining first log data associated with a first vehicle based on first criteria;
determining second log data based on second criteria different from the first criteria;
receiving an instruction to generate a dataset associated with a second vehicle, the instruction specifying proportions of scenarios having respective attributes associated with the dataset;
parameterizing the first log data and the second log data;
determining a similarity between the first log data and the second log data based at least in part on the parameterizing the first log data and the second log data; and
determining, based at least in part on the similarity between the first log data and the second log data, to exclude at least one of the first log data or the second log data from the dataset.

16. The non-transitory computer-readable medium of claim 15, the operations further comprising:

training or validating a machine-learned model associated with the second vehicle based at least in part on the dataset.

17. The non-transitory computer-readable medium of claim 16, wherein the machine-learned model is a prediction component of the second vehicle and the first log data and the second log data are associated with driving scenarios.

18. The non-transitory computer-readable medium of claim 17, wherein the first criteria include at least one of:

an object maneuver;
an object interaction type;
an object type;
a road intersection type;
a location; or
a time of day.

19. The non-transitory computer-readable medium of claim 15, wherein the parameterizing is of one or more attributes of the first log data or the second log data comprising at least one of:

a classification of an object;

a location of the object;

a status of the object;

a location of the second vehicle;

a status of the second vehicle;

an interaction of the object and the second vehicle; or a timestamp associated with a scenario.

20. The non-transitory computer-readable medium of claim 15, wherein the parameterizing includes at least one of: a threshold of a size of the dataset, a rareness score associated with the first log data or the second log data, or a difficulty ranking associated with the first log data or the second log data.

* * * * *